US012591535B2

(12) United States Patent
Girardi et al.

(10) Patent No.: US 12,591,535 B2
(45) Date of Patent: Mar. 31, 2026

(54) STREAM-BASED MODULAR AND SCALABLE HW ACCELERATOR SUB-SYSTEM WITH DESIGN-TIME PARAMETRIC RECONFIGURABLE NPU CORES

(71) Applicant: STMicroelectronics International N.V., Geneva (CH)

(72) Inventors: Francesca Girardi, Cesano Maderno (IT); Thomas Boesch, Rovio (CH); Michele Rossi, Bareggio (IT); Riccardo Massa, Monza (IT); Antonio De Vita, Milan (IT); Carmine Cappetta, Battipaglia (IT); Paolo Sergio Zambotti, Milan (IT); Giuseppe Desoli, San Fermo Della Battaglia (IT); Surinder Pal Singh, Noida (IN)

(73) Assignee: STMicroelectronics International N.V., Geneva (CH)

( * ) Notice: Subject to any disclaimer, the term of this patent is extended or adjusted under 35 U.S.C. 154(b) by 172 days.

(21) Appl. No.: 18/395,019

(22) Filed: Dec. 22, 2023

(65) Prior Publication Data

US 2025/0209025 A1     Jun. 26, 2025

(51) Int. Cl.
G06F 13/40          (2006.01)
(52) U.S. Cl.
CPC ............................... G06F 13/4022 (2013.01)
(58) Field of Classification Search
CPC ................................................ G06F 13/4022
See application file for complete search history.

(56) References Cited

U.S. PATENT DOCUMENTS 9,003,166 B2    4/2015  Sinha et al.
9,313,134 B2    4/2016  Dutta
(Continued)

OTHER PUBLICATIONS

"Hardware accelerator installation and configuration," IBM, URL= https://www.ibm.com/docs/en/ztpf/1.1.0.15?topic=operations-hardware-accelerator-installation-configuration, Mar. 8, 2021. (1 page).
(Continued)

*Primary Examiner* — Henry Tsai
*Assistant Examiner* — Aurangzeb Hassan
(74) *Attorney, Agent, or Firm* — Seed IP Law Group LLP

(57)          ABSTRACT

A device includes a plurality of hardware accelerator islands. The accelerator islands have a plurality of processing elements, a plurality of streaming engines, and a stream switch coupled to the plurality of processing elements and to the plurality of streaming engines. The stream switch streams data between the plurality of processing elements of the accelerator island, and between the plurality of streaming engines of the accelerator island and the plurality of processing elements of the accelerator island. Unidirectional stream switch connections (SSCONNs) are coupled between pairs of stream switches of the plurality of accelerator islands. The stream switches of the plurality of hardware accelerator islands and the SSCONNs form a run-time reconfigurable interconnection mesh between the plurality of processing elements of the plurality of hardware accelerator islands. In operation, the interconnection mesh streams data between processing elements of multiple hardware accelerator islands of the plurality of hardware accelerator islands.

35 Claims, 29 Drawing Sheets

(56) References Cited

U.S. PATENT DOCUMENTS

| | | | |
|---|---|---|---|
| 10,929,175 B2 | 2/2021 | Goyal et al. | |
| 11,323,391 B1 * | 5/2022 | McColgan | H04L 49/30 |
| 11,562,115 B2 | 1/2023 | Boesch et al. | |
| 2018/0032865 A1 * | 2/2018 | Nishimura | G06N 3/08 |
| 2020/0272779 A1 * | 8/2020 | Boesch | G06F 30/34 |
| 2021/0019363 A1 * | 1/2021 | Venkatesh | G06T 3/4023 |
| 2021/0256346 A1 * | 8/2021 | Desoli | G06F 18/217 |
| 2022/0101086 A1 * | 3/2022 | Cappetta | G06F 13/1657 |
| 2022/0276914 A1 | 9/2022 | Kundu et al. | |
| 2023/0039631 A1 | 2/2023 | Guim Bernat et al. | |
| 2025/0045210 A1 * | 2/2025 | Soffer | H04L 63/0853 |

OTHER PUBLICATIONS

Kamaleldin et al., "Towards a Modular RISC-V Based Many-Core Architecture for FPGA Accelerators," *IEEE Access* 8:148812-148826, 2020.

* cited by examiner

Stride=1

Stride=2

218

246

246

190

351

Island_1

Island_2

Island_0

Island_3

246

246

246

246

1   feature and kernel data stream generated by a DMA

2   IPs that use the data stream

1

2

SSCONNs with
Asynchronous
FIFOs

STREAM-BASED MODULAR AND SCALABLE HW ACCELERATOR SUB-SYSTEM WITH DESIGN-TIME PARAMETRIC RECONFIGURABLE NPU CORES

BACKGROUND

Technical Field

The present disclosure generally relates to hardware accelerators in stream-based architectures, such as hardware accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators employing stream-based architectures, including convolutional accelerators, are often employed to accelerate the processing of large amounts of data by a DCNN.

BRIEF SUMMARY

In an embodiment, a device includes a plurality of hardware accelerator islands. The accelerator islands have a plurality of processing elements, a plurality of streaming engines, and a stream switch coupled to the plurality of processing elements and to the plurality of streaming engines. The stream switch streams data between the plurality of processing elements of the accelerator island, and between the plurality of streaming engines of the accelerator island and the plurality of processing elements of the accelerator island. Unidirectional stream switch connections (SSCONNs) are coupled between pairs of stream switches of the plurality of accelerator islands. The stream switches of the plurality of hardware accelerator islands and the SSCONNs form a run-time reconfigurable interconnection mesh between the plurality of processing elements of the plurality of hardware accelerator islands. In operation, the interconnection mesh streams data between processing elements of multiple hardware accelerator islands of the plurality of hardware accelerator islands.

In an embodiment, a system comprises a memory, a host processor coupled to the memory, a host system bus, a plurality of hardware accelerator islands coupled to the host system bus, and a plurality of unidirectional stream switch connections (SSCONNs). Each of the plurality of hardware accelerator islands includes: a plurality of processing elements; a plurality of streaming engines; and a stream switch coupled to the plurality of processing elements and to the plurality of streaming engines. The stream switch, in operation, streams data between the plurality of processing elements of the hardware accelerator island, and between the plurality of streaming engines of the hardware accelerator island and the plurality of processing elements of the hardware accelerator island. The plurality of SSCONNs are coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. In operation, the interconnection mesh streams data between processing elements of multiple hardware accelerator islands of the plurality of hardware accelerator islands.

In an embodiment, a method comprises executing a first neural network on a plurality of hardware accelerator islands. The plurality of hardware accelerators are coupled together using a plurality of unidirectional stream switch connections (SSCONNs). Each hardware accelerator island includes: a plurality of processing elements; a plurality of streaming engines; and a stream switch coupled to the plurality of processing elements and to the plurality of streaming engines. The SSCONNs are coupled between pairs of stream switches of the plurality of hardware accelerator islands, and the stream switches of the plurality of hardware accelerator islands and the SSCONNs form a run-time reconfigurable interconnection mesh between the plurality of processing elements of the plurality of hardware accelerator islands. The executing the first neural network includes: streaming data between processing elements of a hardware accelerator of the plurality of hardware accelerators using a stream switch of the hardware accelerator of the plurality of hardware accelerators; and streaming data between processing elements of multiple hardware accelerator islands of the plurality of hardware accelerator islands via the run-time reconfigurable interconnection mesh.

In an embodiment, a non-transitory computer-readable medium's contents configure processing circuitry to perform a method. The method comprises executing a neural network on a plurality of hardware accelerator islands. The plurality of hardware accelerators are coupled together using a plurality of unidirectional stream switch connections (SSCONNs). Each hardware accelerator island includes: a plurality of processing elements; a plurality of streaming engines; and a stream switch coupled to the plurality of processing elements and to the plurality of streaming engines. The SSCONNs are coupled between pairs of stream switches of the plurality of hardware accelerator islands, and the stream switches of the plurality of hardware accelerator islands and the SSCONNs form a run-time reconfigurable interconnection mesh between the plurality of processing elements of the plurality of hardware accelerator islands. The executing the neural network includes streaming data between processing elements of a hardware accelerator of the plurality of hardware accelerators using a stream switch of the hardware accelerator of the plurality of hardware accelerators; and streaming data between processing elements of multiple hardware accelerator islands of the plurality of hardware accelerator islands via the run-time reconfigurable interconnection mesh.

In an embodiment, a device, comprises memory and processing circuitry coupled to the memory. The memory, in operation, stores instructions. The processing circuitry, in operation, executes the instructions to program a hardware accelerator system to process an epoch of a neural network. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process an epoch of a neural network includes programming a stream switch of an island to stream an intra island data stream associated with the epoch, and programming the reconfigurable interconnection mesh to stream an inter island data stream associated with the epoch.

In an embodiment, a device comprises a memory, processing circuitry coupled to the memory, a bus system, and a hardware accelerator system. The hardware accelerator system includes a plurality of hardware accelerator islands coupled to the bus system. Each hardware accelerator island includes a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The processing circuitry, in operation, programs the hardware accelerator system to process an epoch of a neural network. The programming the hardware accelerator system to process the epoch of the neural network includes programming a stream switch of an island to stream an intra island data stream associated with the epoch, and programming the reconfigurable interconnection mesh to stream an inter island data stream associated with the epoch.

In an embodiment, a method comprises programming a hardware accelerator system to execute an epoch of a neural network, and executing the epoch of the neural network using the programmed hardware accelerator system. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process the epoch of the neural network includes programming a stream switch of a hardware accelerator island to stream an intra island data stream associated with the epoch, and programming the reconfigurable interconnection mesh to stream an inter island data stream associated with the epoch.

In an embodiment, a non-transitory computer-readable medium's contents configure processing circuitry to perform a method. The method comprises programming a hardware accelerator system to execute an epoch of a neural network, and executing the epoch of the neural network using the programmed hardware accelerator system. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process the epoch of the neural network includes programming a stream switch of a hardware accelerator island to stream an intra island data stream associated with the epoch, and programming the reconfigurable interconnection mesh to stream an inter island data stream associated with the epoch. In an embodiment, the contents comprise instructions executable by the processing circuitry.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
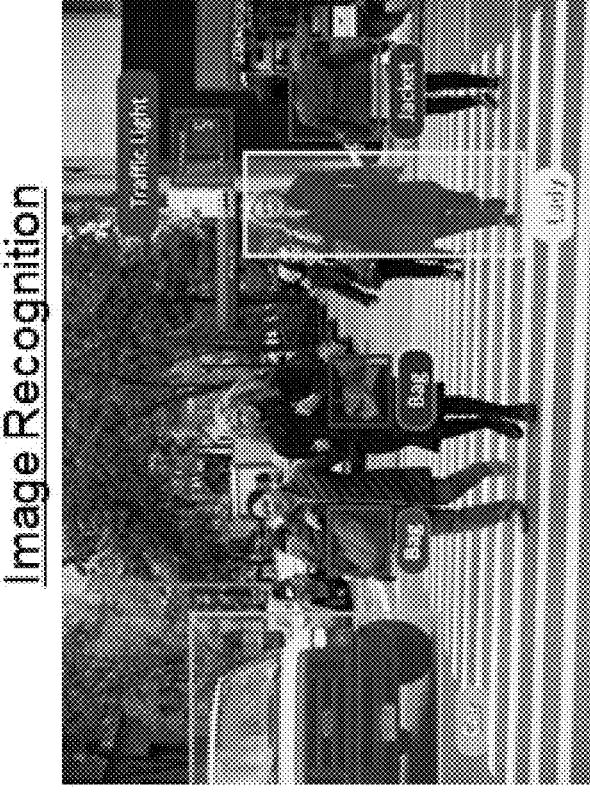
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
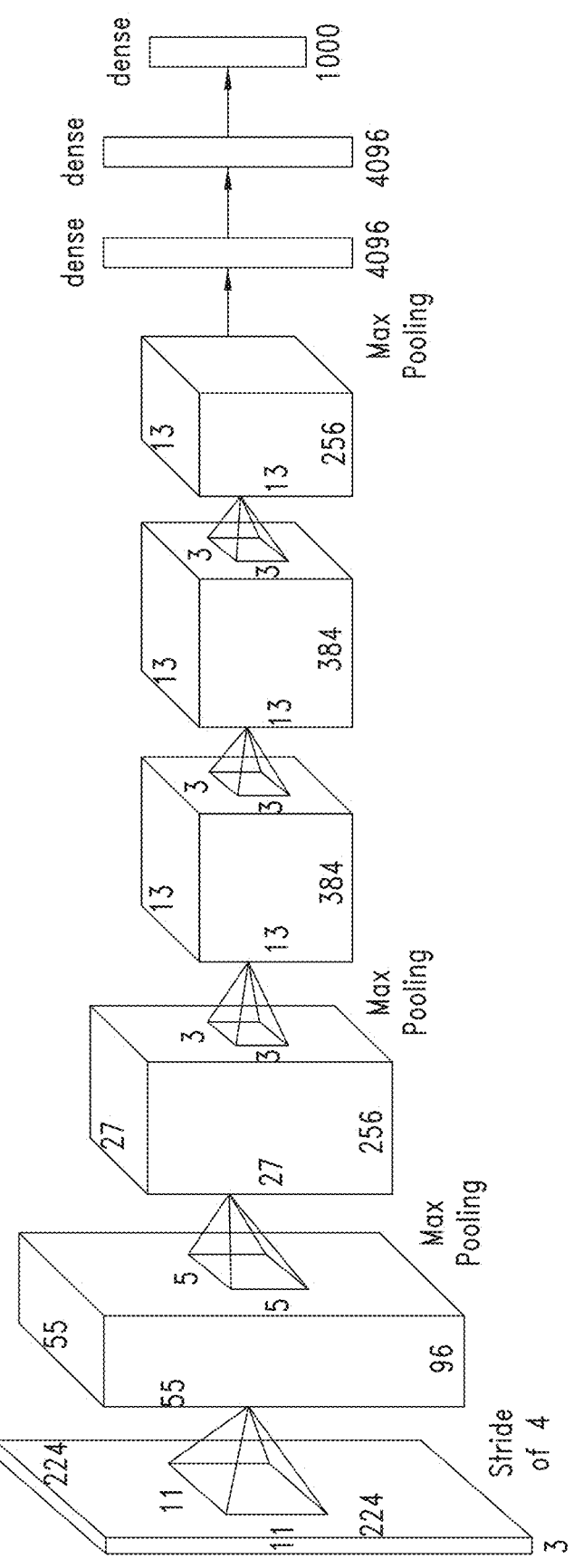
FIG. 3 is a conceptual diagram illustrating an example of a CNN.

CNNs are specific types of deep neural networks (DNN) with one or multiple layers which perform a convolution on a multi-dimensional feature data tensor (e.g., a three-dimensional data tensor having width×height×depth). The first layer is an input layer and the last layer is an output layer. The intermediate layers may be referred to as hidden layers. The most used layers are convolutional layers, fully connected or dense layers, and pooling layers (max pooling, average pooling, etc.). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
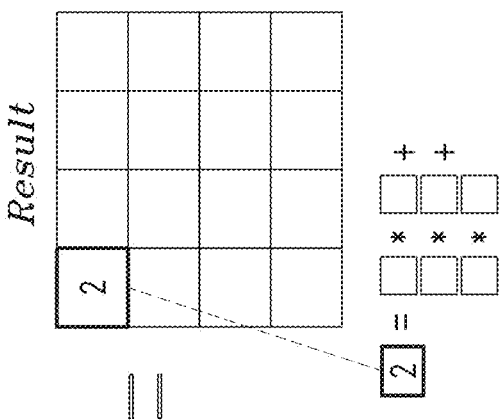
FIG. 4 is a conceptual diagram illustrating an example application of a kernel to a feature map.
Figure 4:
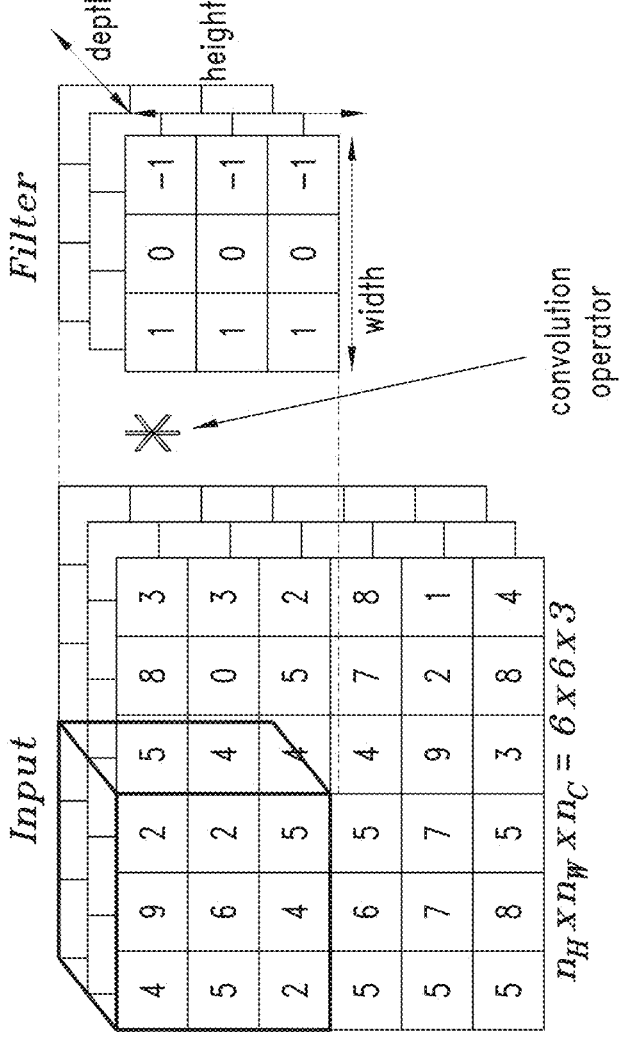

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating an example application of a kernel to a feature map, producing a two-dimensional feature map having a height of 4 and a width of 4.

Figure 5:
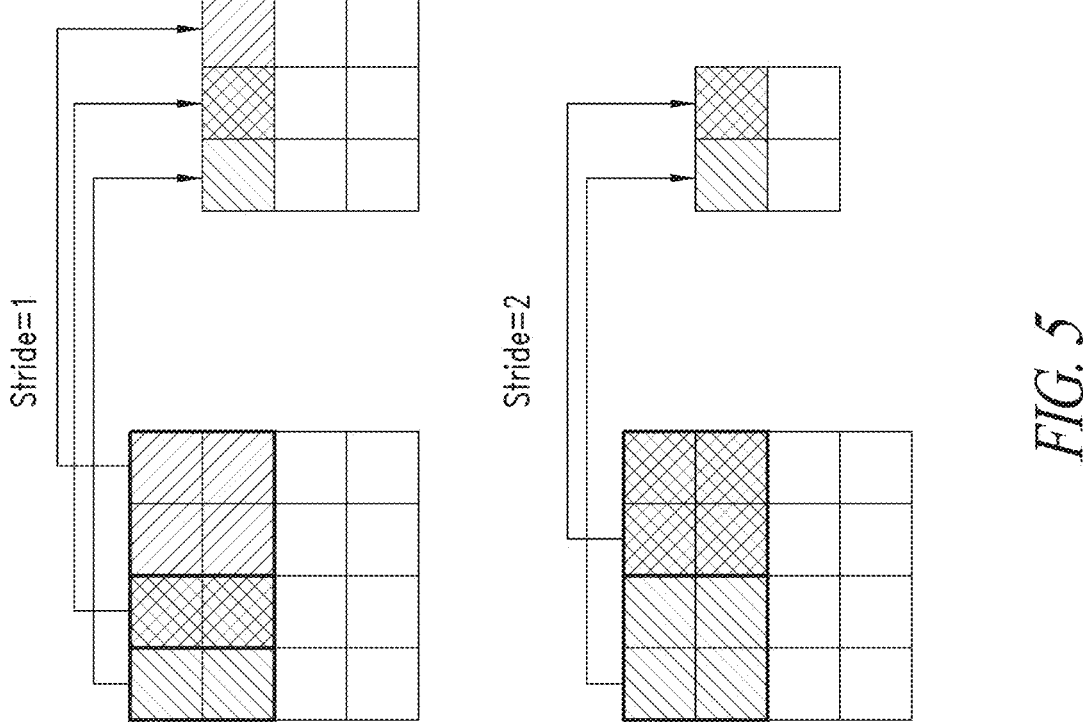
FIG. 5 is a conceptual diagram comparing a stride of 1 and a stride of 2.
Figure 6:
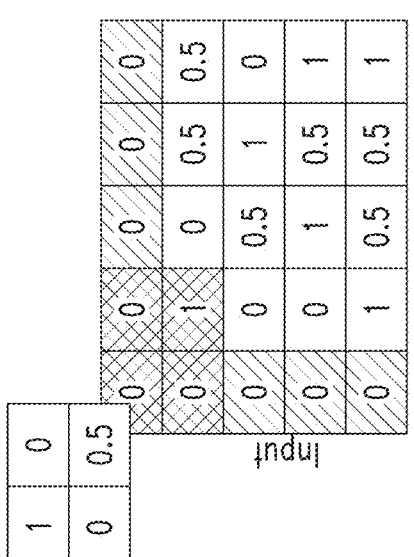
FIG. 6 is a conceptual diagram illustrating application of padding to an input feature map.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters. The stride hyper-parameter indicates a step-size used to slide kernels across an input feature map. FIG. 5 is a conceptual diagram comparing a stride of 1 and a stride of 2. The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map.

Figure 7:
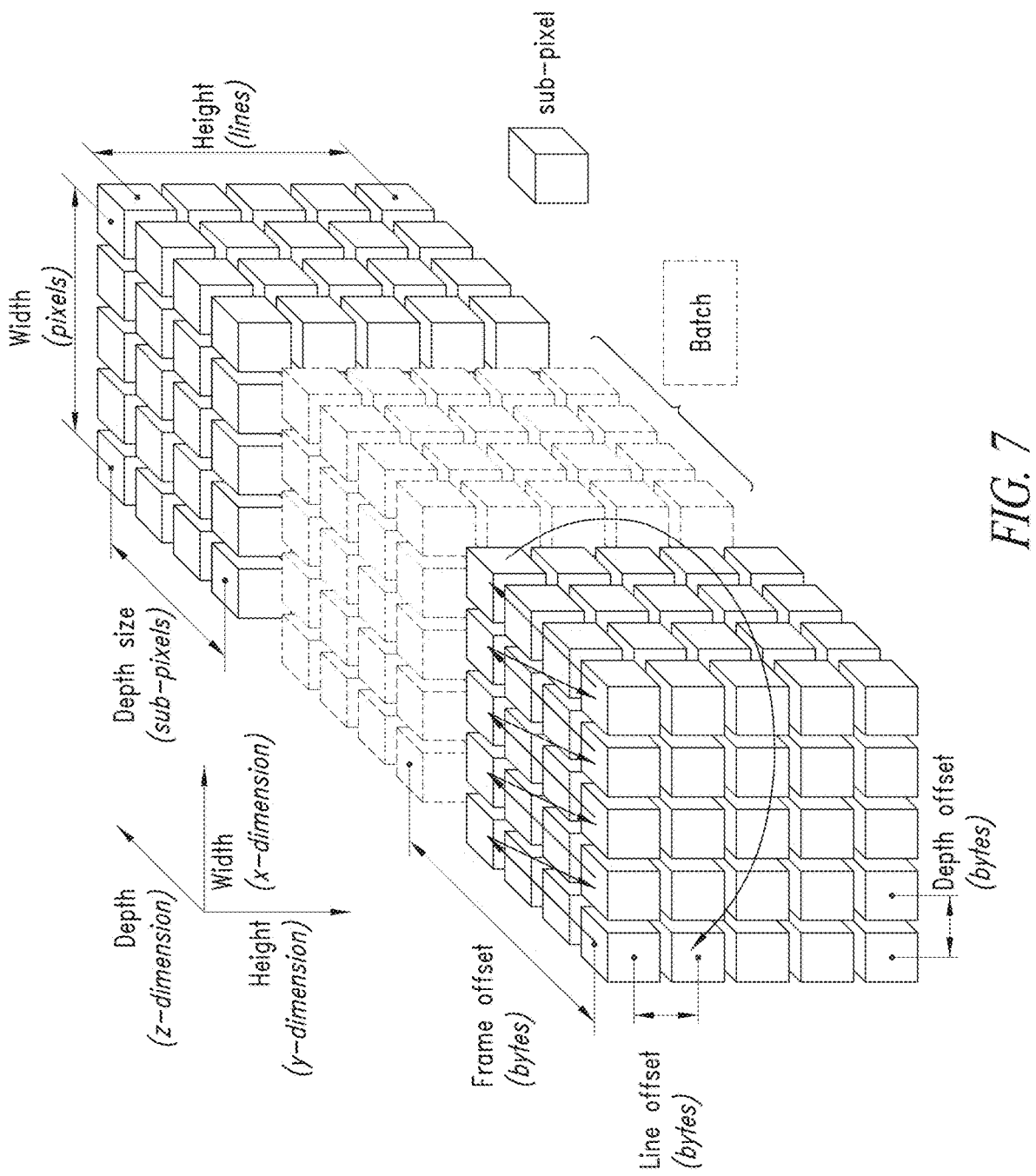
FIG. 7 is a conceptual diagram illustrating the concept of loading feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
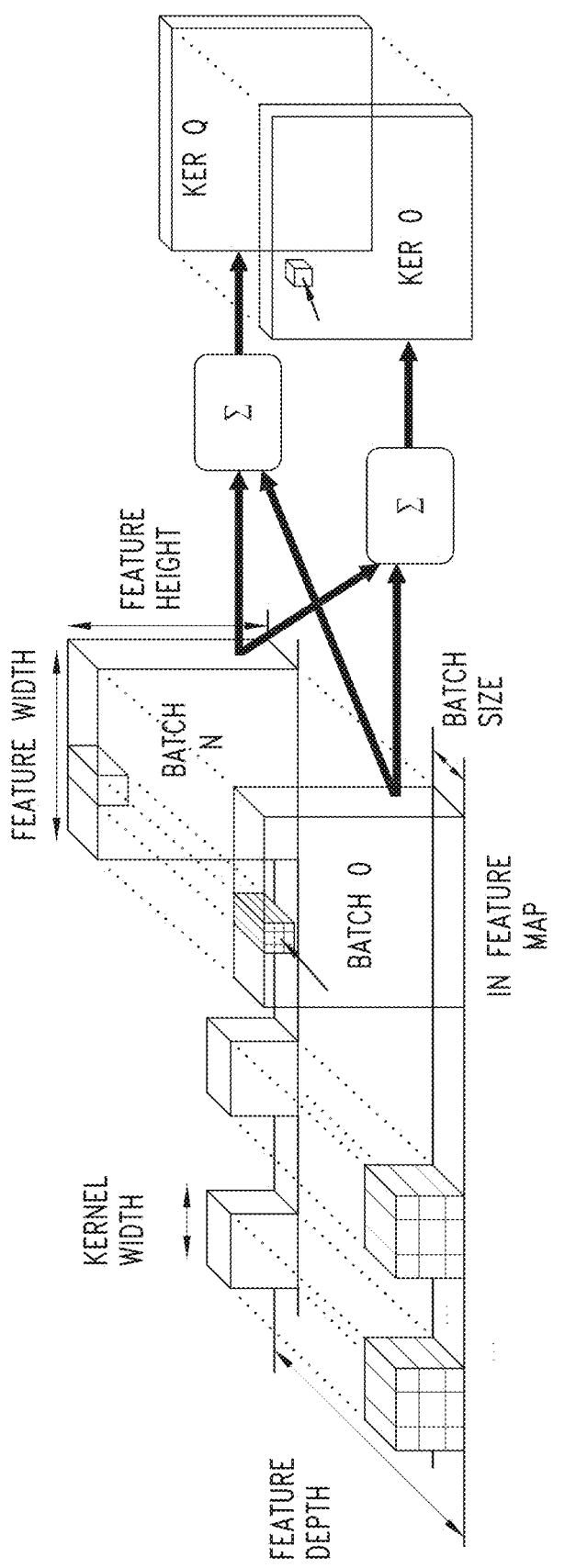
FIG. 8 is a conceptual diagram illustrating the concept of batch processing of a convolution.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

As can be seen, the computations performed by a CNN, or by other neural networks, often include repetitive computations over large amounts of data. For this reason, computing systems having hardware accelerators may be employed to increase the efficiency of performing operations associated with the CNN.

Figure 9:
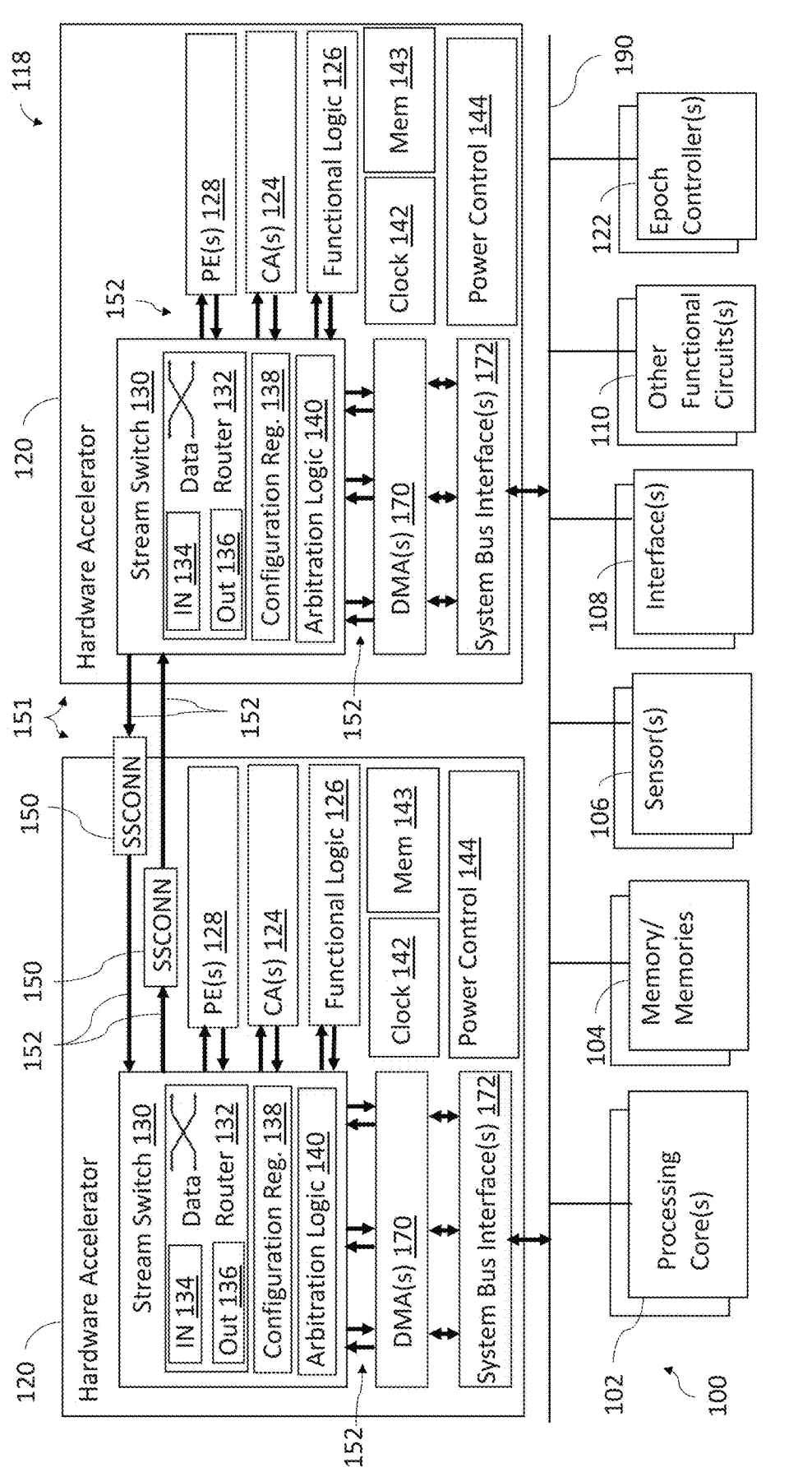
FIG. 9 is a functional block diagram of an embodiment of an electronic device or system of the presently disclosed technology.

FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 may include one or more sensors 106 (e.g., image sensors, audio sensors, accelerometers, gyroscopes, pressure sensors, temperature sensors, etc.), one or more interfaces 108 (e.g., wireless communication interfaces, wired communication interfaces, etc.), and other functional circuits 110, which may include antennas, power supplies, one or more built-in self-test (BIST) circuits, etc., and a main bus system 190. The main bus system 190 may include one or more data, address, power, interrupt, and/or control buses coupled to or between the various components of the system 100. Proprietary bus systems and interfaces may be employed, such as Advanced extensible Interface (AXI) bus systems and interfaces.

The system 100 also includes a hardware accelerator sub-system 118 including one or more hardware accelerators or accelerator islands 120 or neural processing units (NPUs), which, in operation, accelerate the performance of one or more operations, such as operations associated with implementing a CNN. The hardware accelerators 120 include one or more processing elements, as illustrated, one or more convolutional accelerators 124, one or more functional logic circuits 126, and one or more other processing elements 128, to, for example, facilitate efficient performance of convolutions and other operations associated with layers of a CNN. The other processing elements (PEs) 128, in operation, perform processing operations, such as processing operations facilitating the performing of convolutions by a convolutional accelerator 124 or other functional operations performed by a functional logic circuit 126, or other processing operations associated with the hardware accelerator 120. The IPs of the hardware accelerator islands 120 may include memory 143, such as configuration registers, buffers, in-memory compute memory arrays, etc.

The hardware accelerators 120 as illustrated also include a stream switch 130, and one or more streaming engines or DMAs 170. The stream switch 130, in operation, streams data between the convolutional accelerators 124, the functional logic circuits 126, the other processing elements 128, and the streaming engines or DMAs 170 via unidirectional stream links 152. One or more bus arbitrator and system bus interfaces 172 facilitate transfers of data, such as streaming of data, between the hardware accelerator 120 and other components of the system 100, such as the processing cores 102, the memories 104, the sensors 106, the interfaces 108, and the other functional circuits 110, via the bus system 190. The stream switch 130 as illustrated includes a data router 132, which includes a number of input ports 134 and a number of output ports 136. Optional configuration registers 138 and arbitration logic 140 may be employed to configure the data router, for example, to manage the allocation of bandwidth of the data router 132 via virtual channels.

The hardware accelerators 120 as illustrated also include clock circuitry 142, and power control circuitry 144. The clock control circuitry 142 of an accelerator island 120, in operation, provides, controls, or provides and controls a clock employed by the hardware accelerator island 120. The power control circuitry 144 of an accelerator island 120, in operation, provides, controls, or provides and controls power of the hardware accelerator island 120.

The system 100 also includes one or more epoch controllers 122, which in operation, may execute instructions to program hardware accelerators 120 of the hardware accelerator system 118 to perform operations associated with the execution of epochs of a neural network. While the one or more epoch controllers 122 are illustrated as IPs separate from the hardware accelerator system 118 and the hardware accelerator islands 120 in FIG. 9, it is noted that hardware accelerator system 118 and the hardware accelerator islands 120 may include epoch controllers, in addition to or instead of the illustrated epoch controller(s) 122. For example, one of the PEs 128 of a hardware accelerator may, in operation, function as an epoch controller. Any one or various combinations of the epoch controllers may execute instructions to program the hardware accelerator system 118 or portions thereof to perform operations associated with the execution of epochs of a neural network. The one or more host processors 102, in operation, also may function as an epoch controller, alone or in combination with other processing circuitry.

To scale the system, for example, to increase the throughput, one approach might be to scale the size of the individual hardware accelerators. However, the scalability of individual hardware accelerators is limited due to routing congestion, timing, over-utilization and under-utilization issues with regard to internal stream links, limits on the execution of multiple chains in parallel (e.g., stalls), etc.

Another approach to scale the system is to increase the number of hardware accelerators. Hardware accelerators employed in learning/inference machines (e.g., a CNN), however, may have very different requirements, for example, in terms of silicon area, throughput, data type (e.g., analog or digital), neural network topology (e.g., for different neural network models). These differences make it difficult to design modular, scalable architectures that can be flexibly employed, for example, in specialized low-end or high-end applications, or combinations thereof (e.g., parallel operation of different CNNs). For example, the scalability of hardware accelerators is limited by data movement and storage efficiencies with regard to the interconnections between the intellectual properties (IPs), such as interconnections between a plurality of hardware accelerators 120 of the system 100.

Another approach would be to use a switch (e.g., a cross-bar switch) having N input links and M output links to couple a plurality of hardware accelerators 120 together. Each input link can be coupled to one or more of the output links, and each output link coupled to a single input link. The cross-bar switch can be configured at run time to provide additional flexibility. However, cross-bar switches scale in a quadradic manner, and become impractical when a large number of elements (e.g., a large number of hardware accelerators, or individual IPs of the hardware accelerators) are interconnected to provide the functionality of a neural network. In addition, the link utilization may be low in some cases and high in other cases due to unbalanced traffic. These limitations may significantly impact performance in terms of area and power efficiency.

A network on a chip (NoC) may be employed instead. NoCs are widely used in large digital systems as NoCs are easily scalable and scale linearly with the number of PEs connected. Rather than connecting PEs, in a NoC paradigm, a network of routers is created within the chip and the data is packetized and routed between the inputs and outputs. NoCs employ Virtual Channels (VCs) at each input port to mitigate blocking of transmitted packets. However, the routers of NoCs become large and power-hungry when complex routing algorithms are employed, and latency is increased due to additional delay for data packetization, fault tolerance protocols, and flow/congestion control.

To facilitate scaling the number of hardware accelerator islands 120 in a flexible manner, the system 100 of FIG. 9 includes a plurality of unidirectional stream switch connections SSCONN 150. The plurality of SSCONNs 150 couple stream switches 130 of the plurality of hardware accelerators 120 together via unidirectional stream links 152. The stream switches 130, the SSCONNs 150 and the unidirectional stream links 152 together form a point-to-point run-time reconfigurable stream-based interconnection mesh 151. In operation, data may be streamed by the point-to-point reconfigurable stream-based interconnection mesh 151 between pairs of IPs (e.g., between PEs 128, CAs 124, functional logic circuits 126, DMA controllers 170, and various combinations thereof) of the islands 12, as discussed in more detail below. In some cases, data may be streamed between sets of IPs, for example, in the case of broadcasting, when virtual channel support is provided, in the case of context switching, etc.

Embodiments of the system 100 of FIG. 9 may include more components than illustrated, may include fewer components than illustrated, may combine components, may separate components into sub-components, and various combination thereof. For example, various intellectual properties (IPs) of the hardware accelerator (e.g., the convolutional accelerators 124) may include dedicated control registers to store control information, line buffers and kernel buffers may be included in a convolutional accelerator 124 to buffer feature line data and kernel data provided to the convolutional accelerator 124, the clock control circuitry 142 and the power control circuitry 144 may be combined or shared by sets of accelerator islands 120 of the plurality of accelerator islands in some embodiments, etc., and various combinations thereof. As noted above, one or more epoch controllers 122 may be part of the hardware accelerator system in some embodiments.

Figure 10:
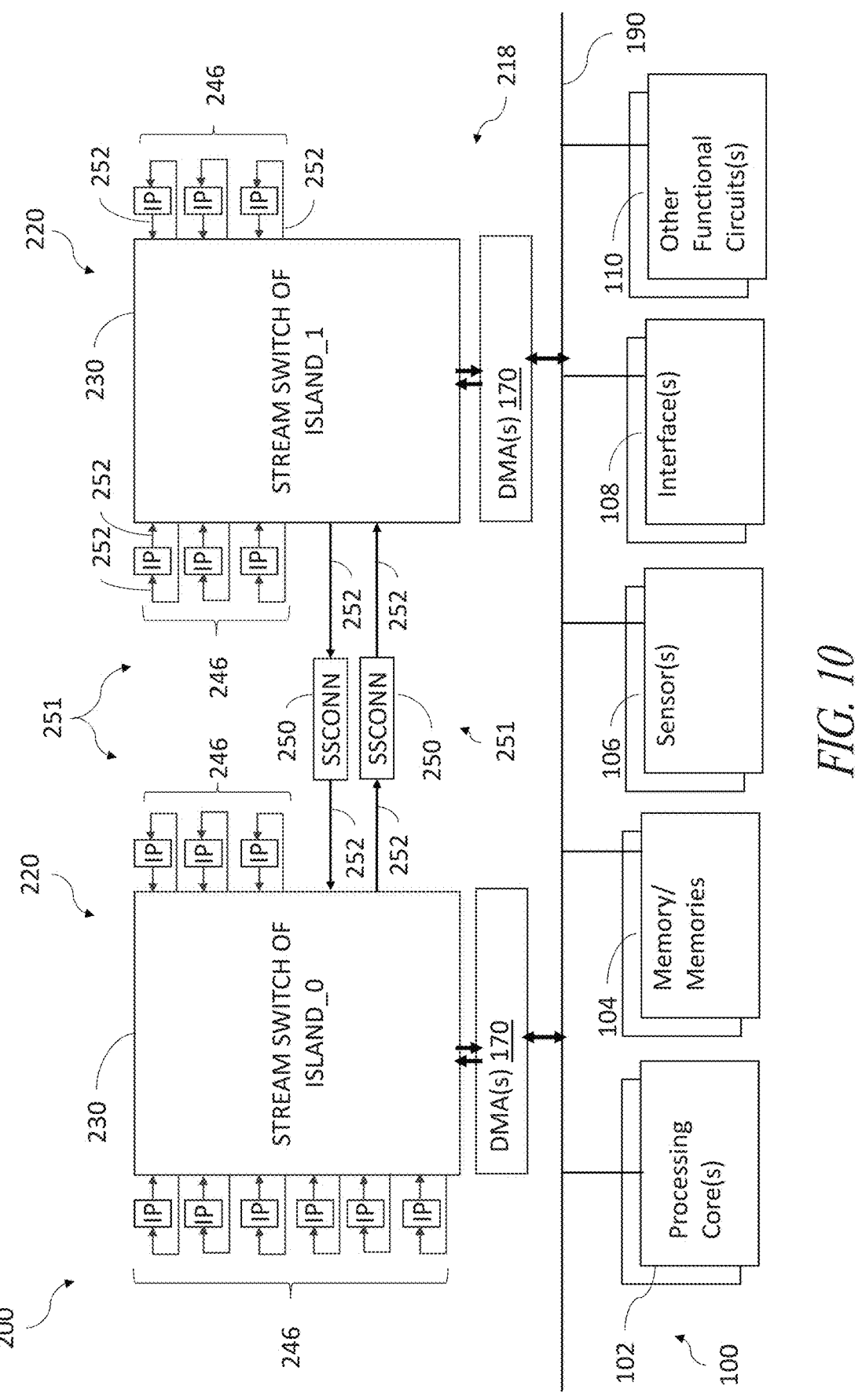
FIG. 10 is a functional block diagram of an embodiment of a system having two hardware accelerator islands with the stream switches of the islands coupled together via unidirectional stream switch connections (SSCONNs).

FIG. 10 is a functional block diagram of a system 200 having a hardware accelerator subsystem 218 with two hardware accelerator modules or islands 220. Each island 220 includes a plurality of functional circuits or IPs 246, such as the processing elements 128, 124 and 126 of FIG. 9, which may be coupled to the stream switch 230 of the respective island 220 via unidirectional stream links 252. As illustrated, island_0 220 and island_1 220 are coupled together using two unidirectional stream switch connections SSCONN 250 and unidirectional stream links 252. The number of islands 220 shown, the number of functional circuits or IPs 246 shown, the number of DMAs 170 shown, and the number of SSCONNs 250 shown are examples only, and different numbers of islands 220, different numbers of functional circuits 246 of respective islands 220, different numbers of DMAs 170, and different numbers of SSCONNs 250 coupling various islands 220 together may be employed in various embodiments. As illustrated, island_0 has 9 IPs 246, and island_1 has 6 IPs 246.

The stream switches 230, the streaming links 252, and the SSCONNs 250 together form a point-to-point reconfigurable stream-based interconnection mesh 251. As illustrated, each island 220 comprises a set of functional circuits 246 which may be run-time interconnected via the point-to-point reconfigurable stream-based interconnection mesh 251. Each island also has access to system memory 104 and other peripherals 106, 108, 110 via sets of DMA controllers 170 interacting with an external bus 190. The IPs of the islands (e.g., IPs 246, DMA controllers 170) are coupled together using a design-time configurable set of point-to-point interconnections of the stream-based interconnection mesh 251. The interconnection mesh 251, in operation, facilitates coupling individual IPs 246 that reside in different islands 220 together in a run-time reconfigurable and flexible manner.

Figure 11:
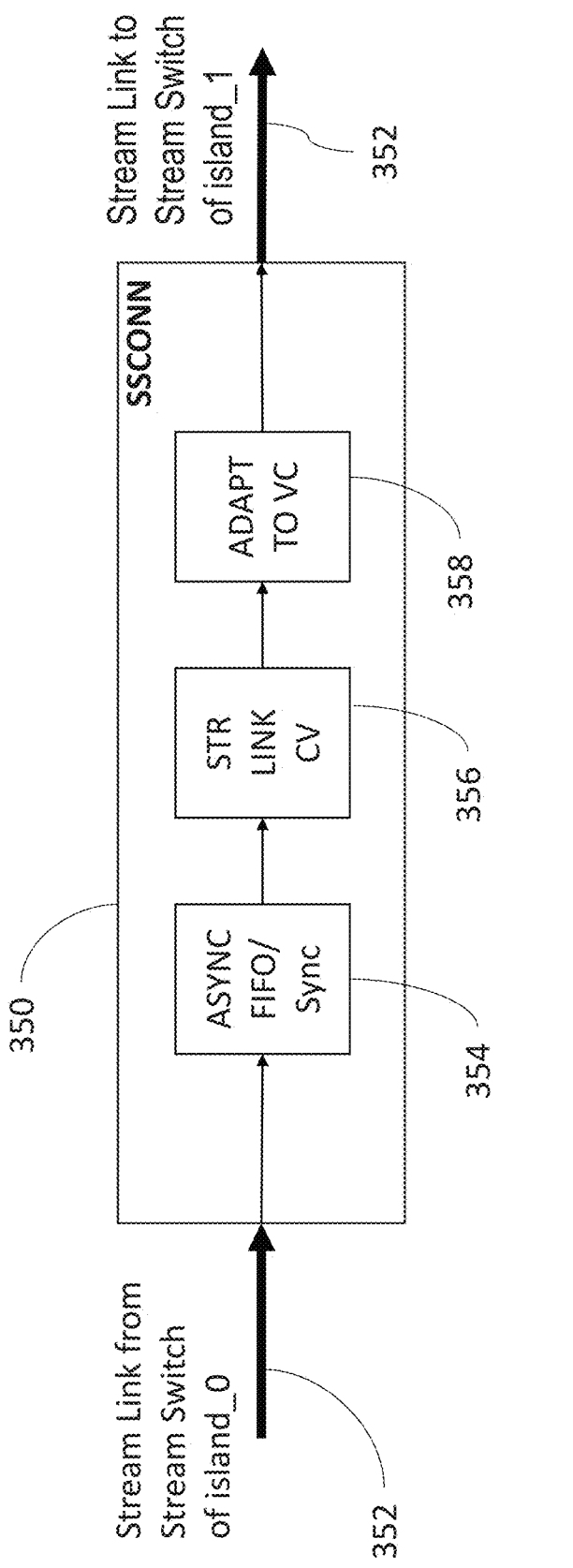
FIG. 11 is a functional block diagram of an embodiment of a unidirectional stream switch connection (SSCONN) that may be employed, for example, to couple a stream switch of a first hardware accelerator island to a stream switch of a second hardware accelerator island.

FIG. 11 is a functional block diagram of an SSCONN 350 that may be employed, for example, in the system 100 of FIG. 9 as one or more of the SSCONNs 150, in the embodiment 200 of FIG. 10 as one or more of the SSCONNs 250, etc. The SSCONN 350 is coupled between a stream switch of a first island (e.g., island_0 of FIG. 10) and a stream switch of a second island (e.g., island_1 of FIG. 10) via unidirectional stream links 352. The SSCONN 350 as illustrated includes an optional asynchronous first-in-first-out (FIFO) buffer or circuit ASYNC FIFO 354, an optional stream link conversion circuit STR LINK CV 356, and an optional virtual channel circuit to adapt the SSCONN for use with stream switches employing virtual channels ADAPT TO VC 358.

The ASYNC FIFO 354, in operation, synchronizes data being streamed between islands operating with different clocks and absorbs throughput fluctuations to facilitate avoiding data loss. The STREAM LINK CV 356, in operation, adapts data widths of data streamed between stream switches of islands operating with different data widths (e.g., adapts 64-bit data streamed from a 64-bit stream switch to a 24-bit data streamed to a 24-bit stream switch). The ADAPT TO VC 358, in operation, adds or removes virtual channel support as needed based on the configurations of the stream switches that are being coupled together by the SSCONN. The optional ASYNC FIFO 354, the optional STR LINK CV 356, and the optional ADAPT TO VC circuit 358, when included, may be arranged in various orders, and may be combined in some embodiments.

Figure 12:
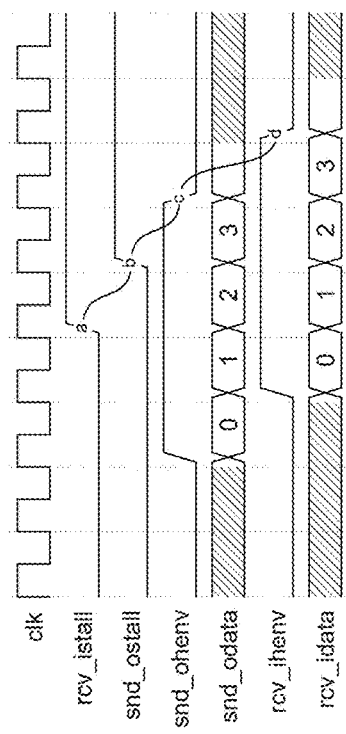
FIG. 12 is a conceptual diagram illustrating example signals that may be employed to control streaming of data between a sending device and a receiving device according to various embodiments.
Figure 12:
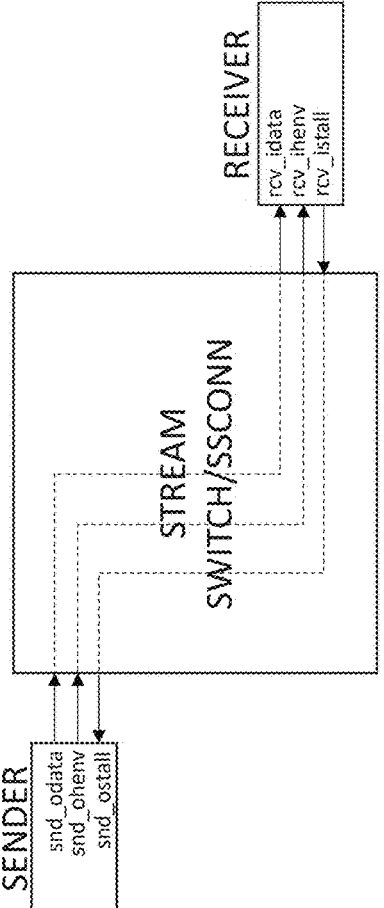

FIG. 12 is a conceptual diagram illustrating example signals that may be employed to control the transmission of data between a sending device and a receiving device coupled to a point-to-point reconfigurable stream-based interconnection mesh, such as the interconnection mesh 151 of the hardware accelerator system 118 of FIG. 9, the interconnection mesh 251 of the hardware accelerator system 218 of FIG. 10, etc. The signals may be transmitted, for example: by unidirectional stream links 252 of FIG. 10 coupling functional circuits 246 of island_0 together via the stream switch 230 of island_0; by unidirectional stream links 252 of FIG. 10 coupling a functional circuit 246 of island_0 to a functional circuit 246 of island_1 via the stream switch 230 of island_0, an SSCONN 250, and the stream switch 230 of island_1; by unidirectional stream links 352 of FIG. 11 coupling a stream switch of island_0 to a stream switch of island_1 via a SSCONN 350 (e.g., with reference to FIG. 10, to couple a functional circuit 246 of island_0 to a functional circuit 246 of island_1); etc. As the stream links and SSCONNs are unidirectional, a sending device (e.g., with reference to FIG. 10, a functional circuit 246 of island_0, the stream switch 230 of island_0, a DMA 170 of island_0, with reference to FIG. 11, the stream switch of island_0) and a receiving device (e.g., with reference to FIG. 10, a functional circuit 246 of island_0, the stream switch 230 of island_0, with reference to FIG. 11, the stream switch of island_1), of a stream link or SSCONN can be identified. The sending device and the receiving device of a stream link or an SSCONN may vary during execution of an epoch, for example, when virtual channels are employed, when context switching occurs, etc. In addition, data may be streamed from a sending device to more than one receiving device, for example, when broadcasting is employed.

The sending device is clocked using a clock signal CLK, and signals the presence of valid data (snd_odata) on the stream link by transmitting (e.g., via stream links, stream switches, SSCONNs, or various combinations thereof) a data ready signal (snd_ohenv) to the receiving device (rcv_i- henv). The receiving device absorbs the data (rcv_idata) while it is available on the stream link, otherwise the data will be lost. When the receiving device determines that it will no longer be able to absorb the data, the receiving device asserts a stall signal (a, rcv_istall) which is transmitted (e.g., via stream links, stream switches, SSCONNs, or various combinations thereof) to and received by the sending device (b, snd_ostall). The sending device has a determined number of clock cycles (e.g., 4 clock cycles, or other design dependent number of clock cycles) after the stall signal (rcv_istall) is asserted in which to stop transmitting data (c), to the receiving device, so that the data is received (d) by the receiving device instead of being lost.

Figure 13:
FIG. 13 is a conceptual diagram illustrating an example of four hardware accelerator islands having functional elements interconnected with a point-to-point reconfigurable stream-based interconnection mesh employing unidirectional stream switch connections (SSCONNs) between stream switches of the islands.

FIG. 13 is a conceptual diagram illustrating four islands, each island having a set of functional elements 246 interconnected with a point-to-point run-time reconfigurable stream-based interconnection mesh 351 employing unidirectional stream links (see stream links 152 of FIGS. 9, stream links 252 of FIG. 10) and SSCONNs (see SSCONNs 150 of FIG. 9, SSCONNs 250 of FIG. 10). Each Island has access to system memory and other peripherals via a set of DMAs interacting with a system bus 190. The point-to-point reconfigurable interconnection mesh 351 facilitates streaming data between IPs, such as the functional circuits 246, that reside in different islands. Each island is design time configurable in terms of number of IPs, facilitating area scaling, clock control, and power consumption scaling individually for each island. Similarly, the interconnection mesh 351 is design time configurable in terms of the number and placement of SSCONNs employed to couple stream switches of the islands together, and the characteristics of the individual SSCONNs (e.g., whether the SSCONN includes an optional ASYNC FIFO, an optional STR LINK CV, an optional ADAPT TO VC circuit, etc.), and run-time reconfigurable in terms of the point-to-point interconnections.

Figure 14:
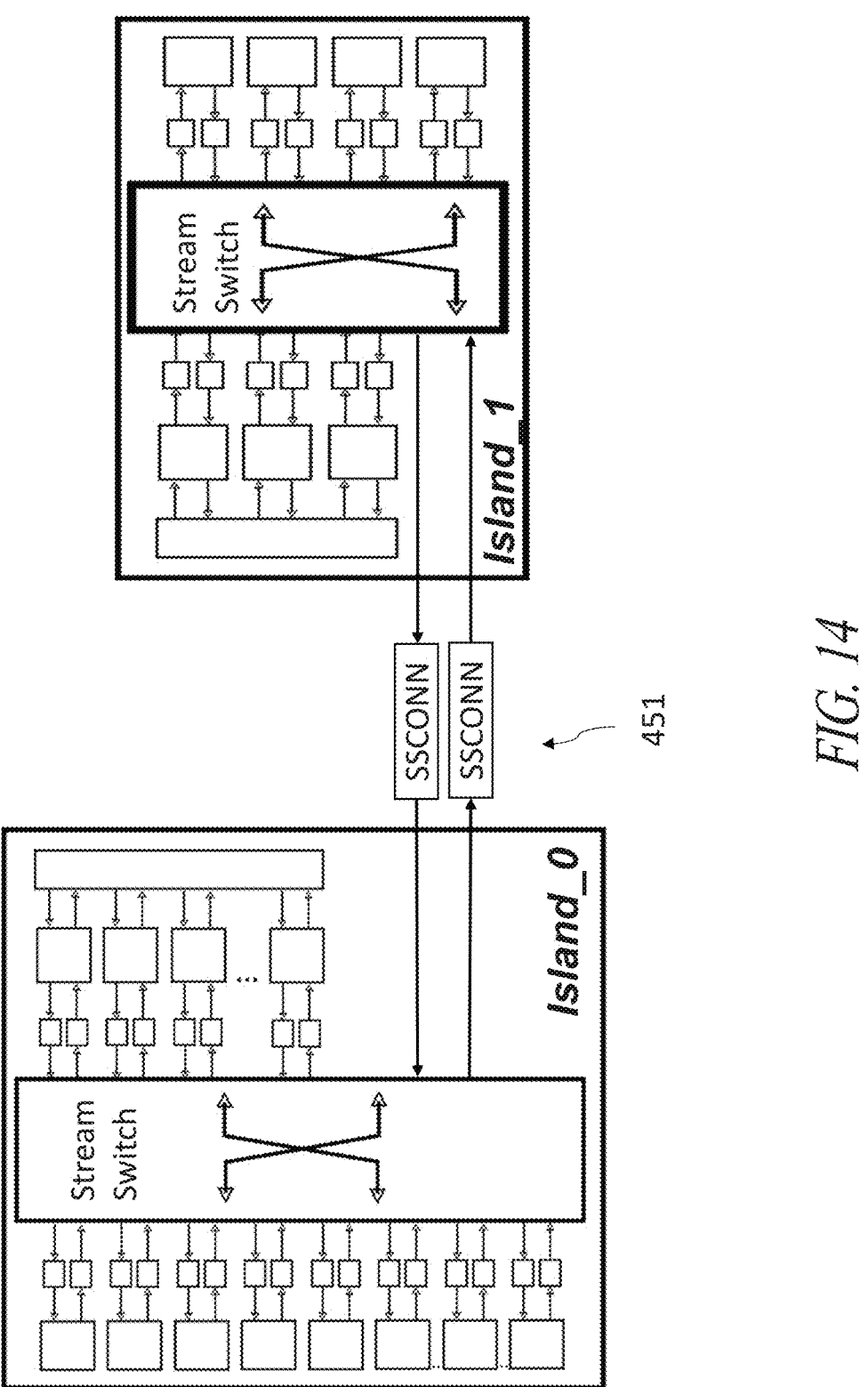
FIG. 14 is a conceptual diagram illustrating an example of the increased flexibility of modular island embodiments in terms of chip area and performance choices in a design phase for individual islands according to various embodiments.

FIG. 14 is a conceptual diagram illustrating the increased flexibility facilitated by the use of modular island embodiments employing a point-to-point interconnection mesh, in terms of chip area and performance choices at the design phase. As illustrated, the stream switches of island_0 and island_1 are coupled together via two SSCONNs of an interconnection mesh 451, one SSCONN streams data from island_0 to island_1, and the other SSCONN streams data from island_1 to island_0. Island_0 has more IPs than island_1, and thus has a larger chip area. IPs of an island may stream data to and from IPs of another island, which facilitates designing islands so as to reduce the overall chip area. For example, the islands may share an IP, instead of each island having its own implementation of an IP.

Figure 15:
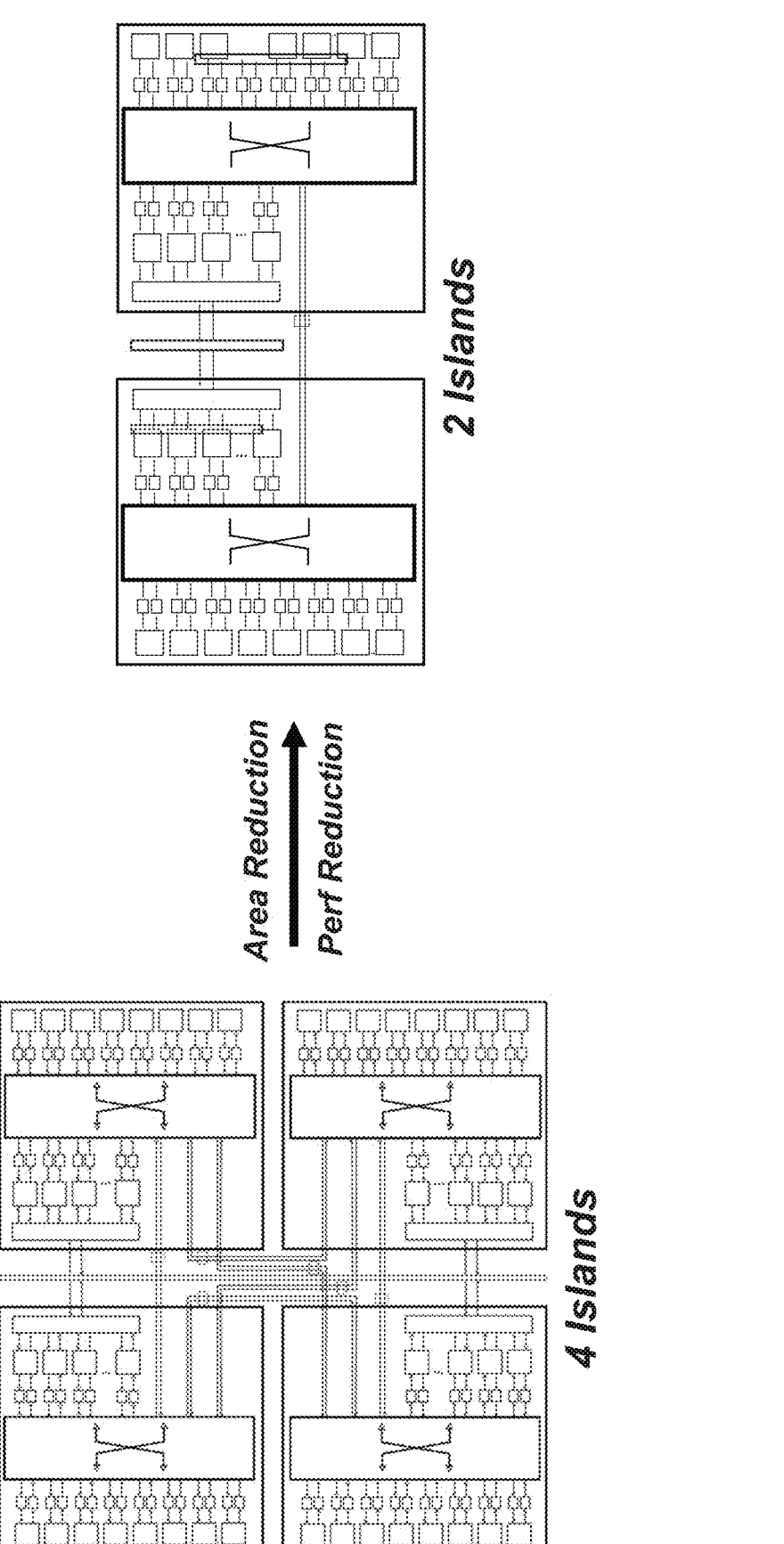
FIG. 15 is a conceptual diagram illustrating an example of the increased flexibility of modular island embodiments in terms of the number of islands selected in a design phase according to various embodiments.

FIG. 15 is a conceptual diagram illustrating the increased design flexibility facilitated by the use of modular island embodiments employing an interconnection mesh in terms of the number of islands selected at the design phase (e.g., 2, 4, 8, etc.). More islands may be employed in an embodiment where higher performance is desired. For example, as illustrated in FIG. 15, a four island embodiment may be selected when high performance is desired. Conversely, fewer islands may be employed in an embodiment to reduce the chip area, with a trade off of reduced performance. For example, a two island embodiment may be employed when it is desired to reduce the chip area. The use of an interconnection mesh facilitates increased flexibility by reducing the design and operational overhead associated with increasing the number of islands. For example, the use of an interconnection mesh facilitates independently clocking islands or groups of islands of a configuration, which simplifies the clock control circuitry and connections, and also facilitates independent power control and clocking of the islands during operation.

Figure 16:
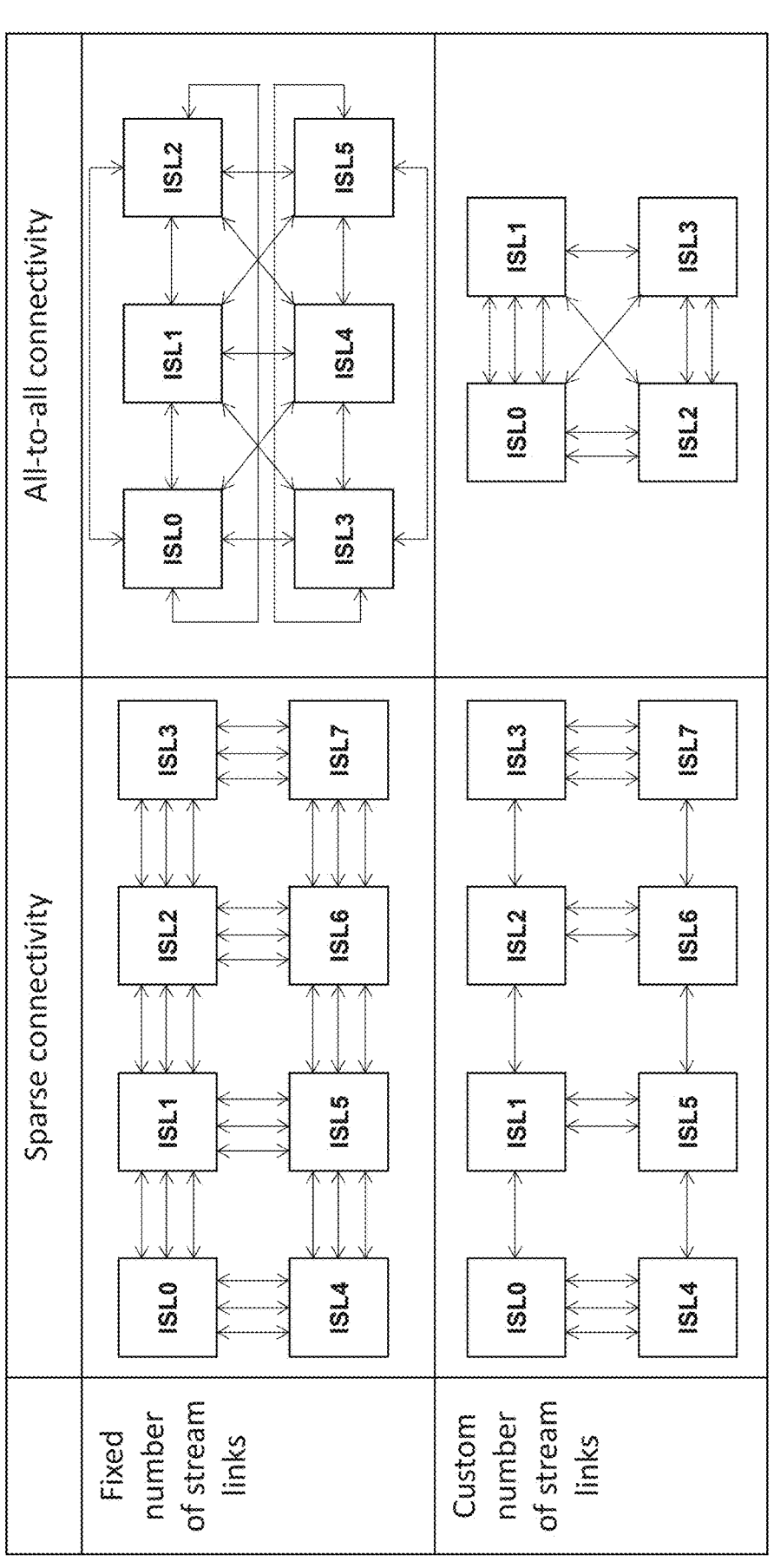
FIG. 16 is a conceptual diagram illustrating an example of the increased flexibility of modular island embodiments in terms of the number of SSCONNs selected in a design phase to couple stream switches of the islands together according to various embodiments.

FIG. 16 is a conceptual diagram illustrating the increased design flexibility facilitated by the use of modular island embodiments employing an interconnection mesh in terms of the number of connections between the islands of the interconnected mesh. For ease of illustration, pairs of SSCONNs between islands are illustrated as double sided arrows in FIG. 16. However, individual SSCONNs may be employed between islands instead of pairs of SSCONNs, and various combinations of pairs and individual SSCONNs may be employed.

In a first example of FIG. 16, sparse connectivity may be employed to couple pairs of islands together using a fixed number of links between selected pairs of islands. As illustrated, a fixed number of three pairs of SSCONNs couple adjacent island together. In another example, all-to-all connectivity may be employed to couple each island to each of the other islands using a fixed number of connections. As illustrated, a fixed number of one pair of SSCONNs couples each island of a set of islands to each of the other islands of the set of islands.

Instead of using a fixed number of SSCONNs to couple islands of a set of islands together, a custom number of SSCONNs may be selected at the design phase for both sparse connectivity embodiments and all-to-all connectivity embodiments to couple pairs of islands of a set of islands together. In the illustrated example of sparce connectivity with a custom number of SSCONN pairs, varying numbers of pairs of SSCONNs are employed to pairs of adjacent islands together. In the illustrated example of all-to-all connectivity with a custom number of SSCONN pairs, varying numbers of SSCONN pairs are employed to couple each island to each of the other islands of the set of islands.

Figure 17:
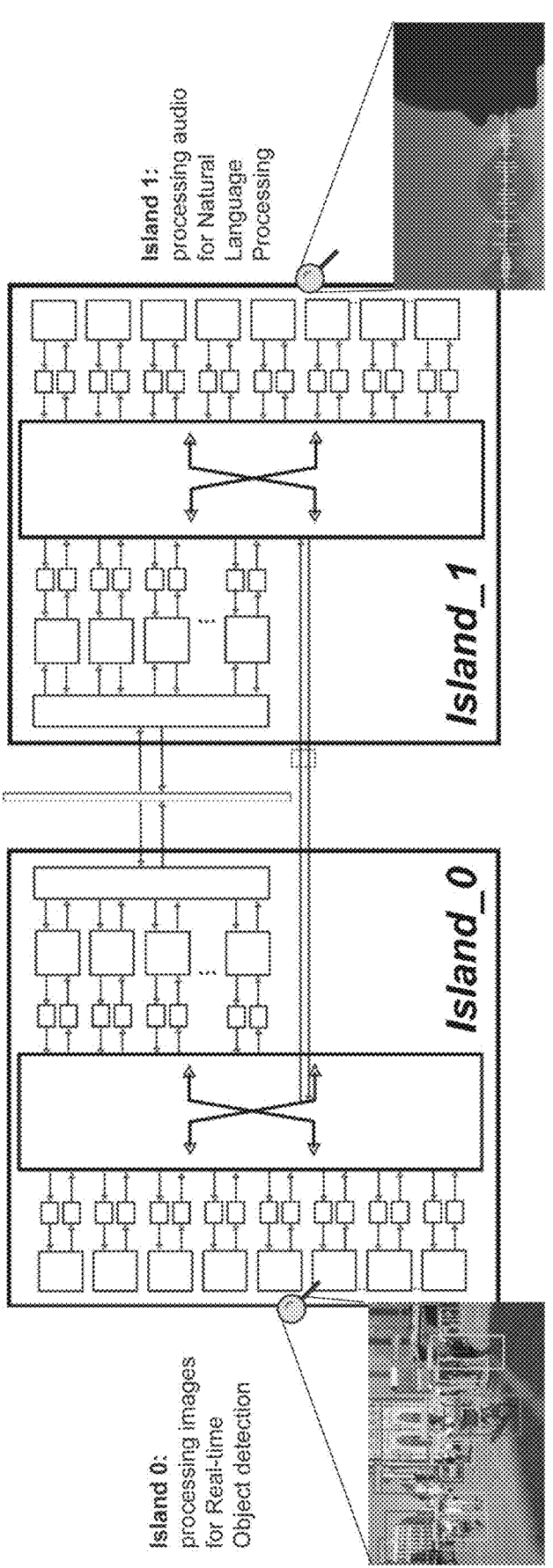
FIGS. 17, 18 and 19 are conceptual diagrams illustrating examples of the increased flexibility of modular island embodiments in terms of run-time workload distribution according to various embodiments.

FIG. 17 is a conceptual diagram illustrating the increased flexibility facilitated by the use of modular island embodiments employing an interconnection mesh in terms of run-time workload distribution. Different islands or groups of islands may implement multiple processing chains, such as parallel neural networks of different types. As illustrated, island_0 may be employed at run time to perform object detection, while island_1 may be employed at run time to perform audio detection and audio signal processing. Although island_0 and island_1 as illustrated appear to have a similar configuration, the islands may have different configurations in some embodiments (see FIG. 14).

Figure 18:
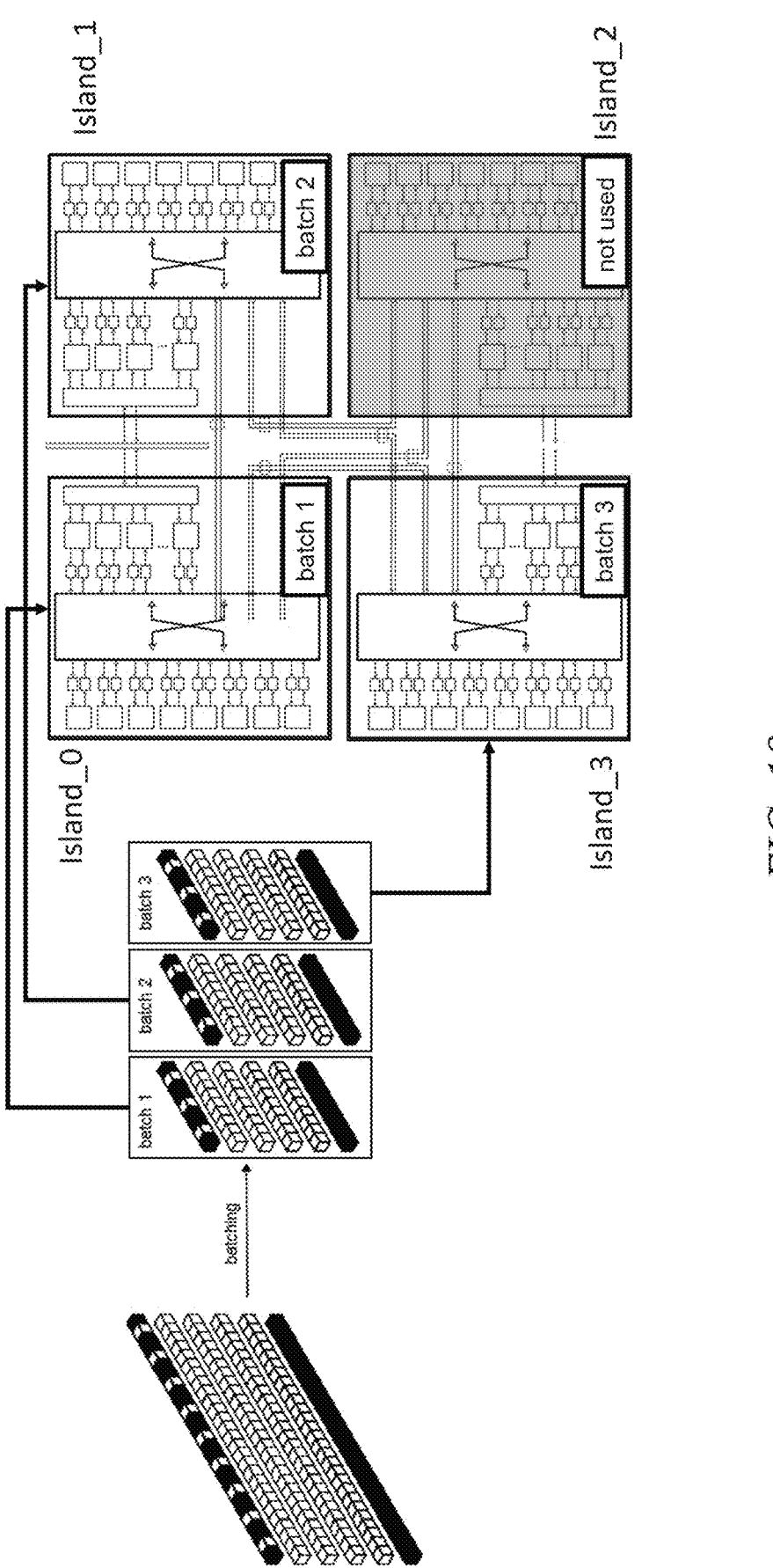

FIG. 18 is another conceptual diagram illustrating the increased flexibility facilitated by the use of modular island embodiments employing an interconnection mesh in terms of run-time workload distribution. Large workloads may be processed using batch processing. Individual batches may be processed in parallel using different islands or sets of islands. Unused islands may be powered down. As illustrated, batch 1 is processed by island_0, batch 2 is processed by island_1, batch 3 is processed by island_3, and island_2 is powered down. The interconnection mesh may be employed to route the appropriate data streams to the appropriate islands for processing.

Figure 19:
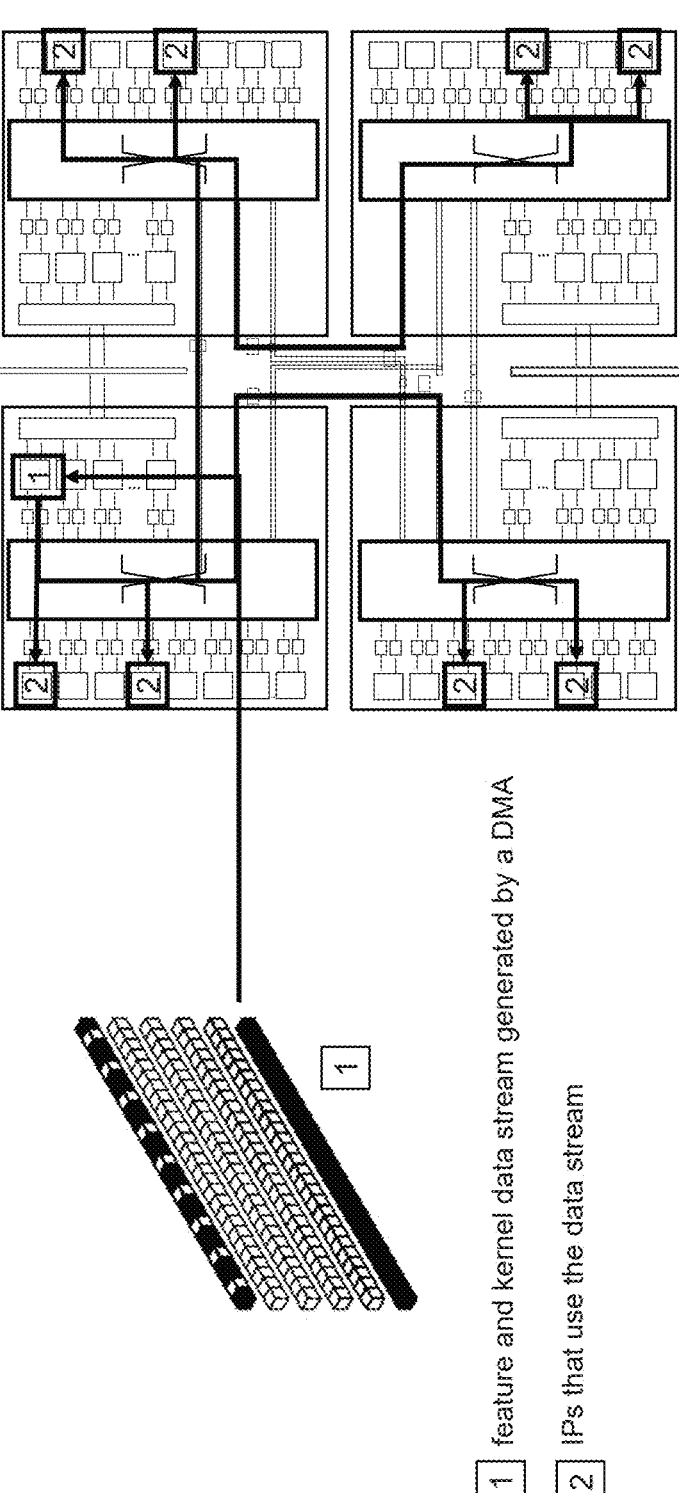

FIG. 19 is another conceptual diagram illustrating the increased flexibility facilitated by the use of modular island embodiments employing an interconnection mesh in terms of run-time workload distribution. Streamed data, such as kernel and feature data, is often reused in neural networking environments. Instead of repeatedly fetching or generating data, the data may be streamed to multiple processing elements in multiple islands for processing. As illustrated in FIG. 19, kernel and feature data 1, generated or retrieved by a DMA of island_0, may be shared with processing elements 2 of multiple islands by streaming the data using streaming links (see streaming links 252 of FIG. 10) and SSCONNs (see SSCONNs 250 of FIG. 10) of the reconfigurable interconnection mesh (see mesh 251 of FIG. 10). This facilitates reducing the number of times data needs to be retrieved or generated for processing.

Figure 20:
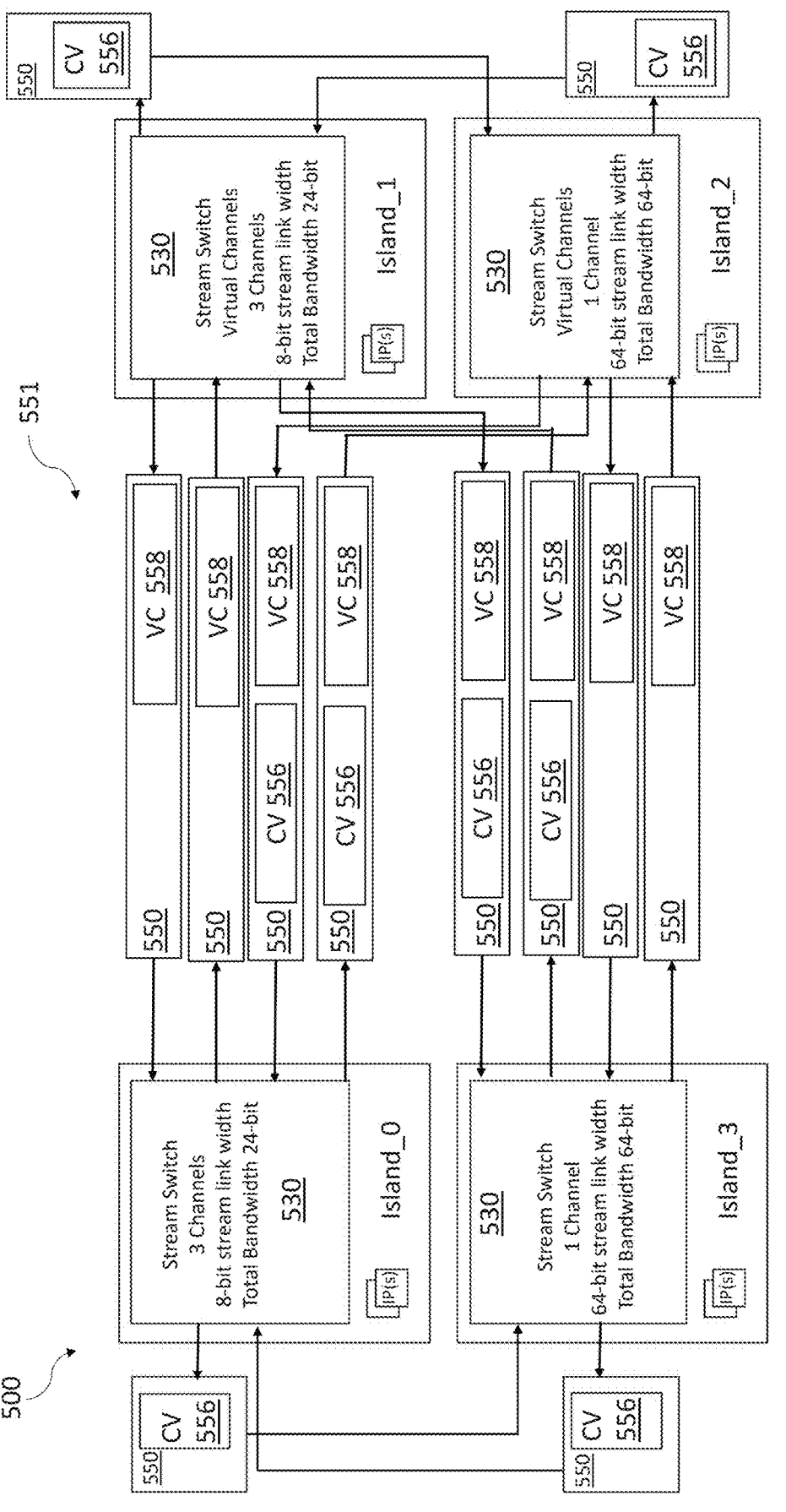
FIG. 20 is a functional block diagram illustrating an embodiment of a system coupling stream switches of a set of four hardware accelerator islands together using an interconnection mesh having a plurality of SSCONNs when the stream switches of the islands have different channel or bandwidth characteristics.

FIG. 20 is a functional block diagram illustrating an embodiment of a system 500 coupling a set of four hardware accelerator islands island_0, island_1, island_2, and island_3 together using an interconnection mesh 551 having a plurality of SSCONNs 550. As illustrated, island_0 has a stream switch 530 which, in operation, has a bandwidth of 24-bits streaming 3 8-bit stream link width channels without employing support for virtual channels, island_1 has a stream switch 530 which, in operation, has a bandwidth of 24-bits streaming 3 8-bit stream link width channels and employs support for virtual channels, island_3 has a stream switch 530 which, in operation, has a bandwidth of 64-bits streaming a 64-bit stream link width channel and without employing support for virtual channels, and island_2 has a stream switch 530 which, in operation, has a bandwidth of 64-bits streaming a 64-bit stream link width channel employing support for virtual channels.

Because the stream switch 530 of island_0 does not support virtual channels and the stream switch 530 of island_1 supports virtual channels, the SSCONNs 550 coupling the stream switch 530 of island_0 to the stream switch 530 of island_1 include virtual channel support circuitry 558, which, in operation, adds and removes support for virtual channels to data streams transmitted through the SSCONNs 550 as needed. Similarly, the SSCONNs 550 coupling the stream switch 530 of island_3 to the stream switch 530 of island_2 include virtual channel support circuitry 558, which, in operation, add and remove support for virtual channels to data streams transmitted through the SSCONNs 550 as needed.

Because the stream switch 530 of island_0 has a total bandwidth of 24-bits and in operation streams three channels of 8-bits each, and the stream switch 530 of island_3 has a total bandwidth of 64-bits and streams a single 64-bit channel, the SSCONNs 550 coupling the stream switch 530 of island_0 to the stream switch 530 of island_3 include channel conversion circuitry 556, which, in operation, converts three-channel 24-bit width data streams to single channel 64-bit width data streams and vice-versa as need to data streams transmitted through the SSCONNs 550. Similarly, the SSCONNs 550 coupling the stream switch 530 of island_1 to the stream switch 530 of island_2 include channel conversion circuitry 556, which, in operation, converts three-channel 24-bit width data streams to single channel 64-bit width data streams and vice-versa as need to data streams transmitted through the SSCONNs 550.

The SSCONNs 550 coupling the stream switch 530 of island_0 to the stream switch 530 of island_2 include both channel conversion circuitry 556, which, in operation, converts three-channel 24-bit width data streams to single channel 64-bit width data streams and vice-versa as need to data streams transmitted through the SSCONNs 550, and virtual channel support circuitry 558, which, in operation, adds and removes support for virtual channels to data streams transmitted through the SSCONNs 550 as needed.

Similarly, the SSCONNs 550 coupling the stream switch 530 of island_1 to the stream switch 530 of island_2 include channel conversion circuitry 556, which, in operation, converts three-channel 24-bit width data streams to single channel 64-bit width data streams and vice-versa as need to data streams transmitted through the SSCONNs 550.

Figure 21:
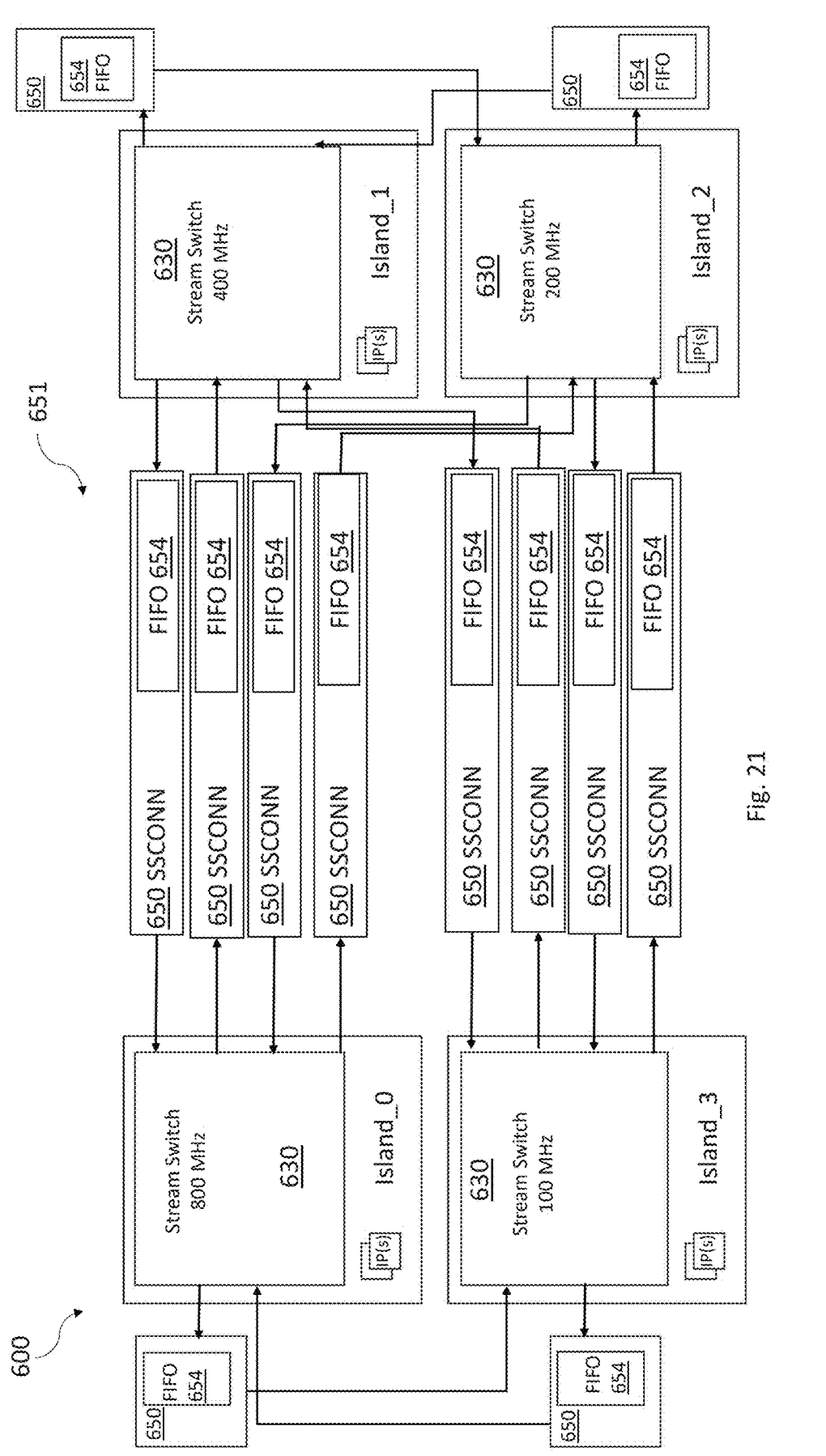
FIG. 21 is a functional block diagram illustrating an embodiment of a system coupling stream switches of a set of four hardware accelerator islands using an interconnection mesh having a plurality of SSCONNS when the islands have different operating frequencies.

FIG. 21 is a functional block diagram illustrating an embodiment of a system 600 coupling a set of four hardware accelerator islands island_0, island_1, island_2, and island_3 together using an interconnection mesh 651 having a plurality of SSCONNs 650. As illustrated, island_0 has an operating frequency of 800 MHZ, island_1 has an operating frequency of 400 MHZ, island_2 has an operating frequency of 200 MHz, and island_3 has an operating frequency of 100 MHz. To compensate for the different operating frequencies of the islands, the SSCONNs 650 of the system 600 include asynchronous FIFO buffers and synchronization circuitry 654, which, in operation, synchronize the data streams transmitted via the SSCONNs between the stream switches operating at the various operating frequencies. The frequencies shown are exemplary, and different operation frequencies may be employed, and may vary in operation (e.g., the frequencies may be tuned as part of a run-time power-management process, for example, a slower operating frequency may be employed in a power-saving mode by an accelerator island, and a faster operating frequency may be employed in a high-performance mode by the accelerator island). The embodiments of FIGS. 20 and 21 may be combined in some embodiments.

Figure 22:
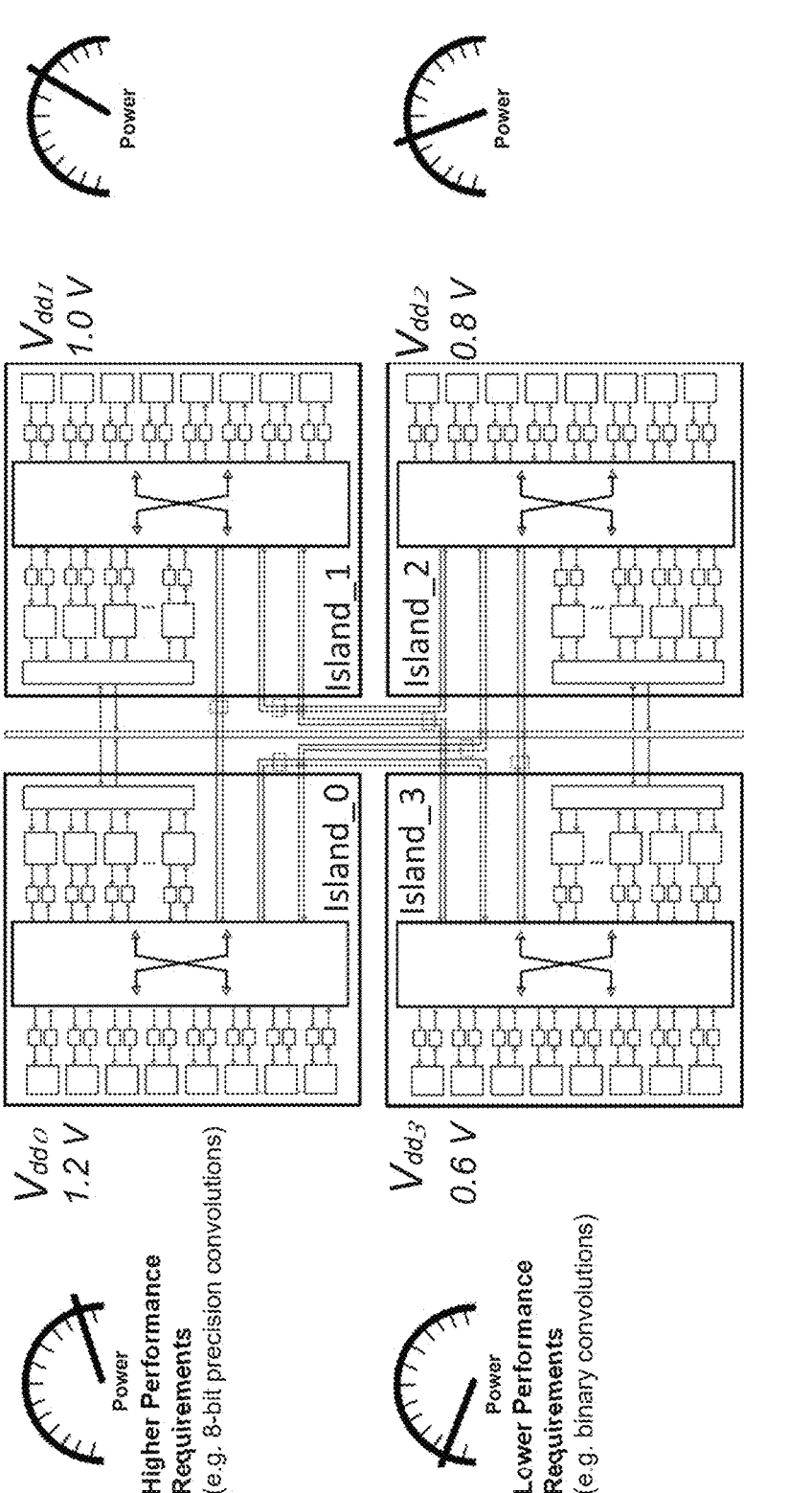
FIG. 22 is a conceptual diagram illustrating an example application of independent real-time power tuning to individual islands of a plurality of islands coupled together using an interconnection mesh.

FIG. 22 is a conceptual diagram illustrating an application of independent real-time power tuning to individual islands of a plurality of islands coupled together using an interconnection mesh. As illustrated, island_0 is performing operations in which higher performance is desired, such as 8-bit precision convolutions. Thus, island_0 may be provided with a higher operating voltage of a set of selectable operating voltages, as illustrated, 1.2 volts by a power control circuit (see power control 144 of FIG. 9). Island_3 is performing operations in which higher performance is not necessary, such as binary convolutions. Thus, island_3 may be provided with a lower operating voltage of a set of selectable operating voltages, as illustrated, 0.6 volts by a power control circuit (see power control 144 of FIG. 1). As shown, island_1 is being supplied with a 1.0 volt operating voltage and island_2 is being provided with a 0.8 volt operating voltage.

Figure 23:
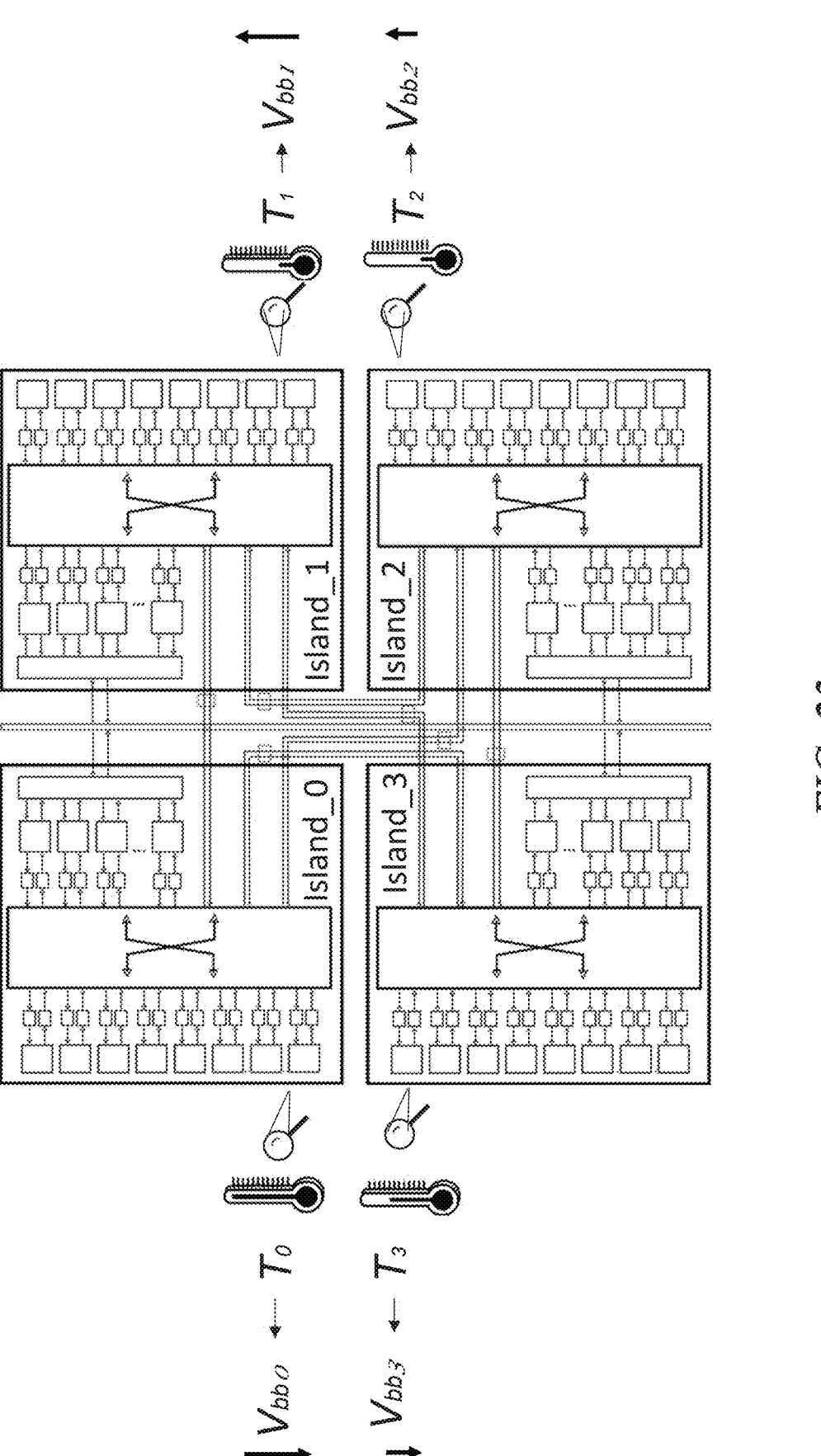
FIG. 23 is another conceptual diagram illustrating an example application of independent real-time power tuning in the form of body-bias voltage tuning to individual islands of a plurality of islands coupled together using an interconnection mesh based on per island temperature sensing.

FIG. 23 is another conceptual diagram illustrating an application of independent real-time power tuning to individual islands of a plurality of islands coupled together using an interconnection mesh. Temperatures of the individual islands may be sensed, for example, by thermocouples or NTC sensors embedded on-chip. As illustrated, island_0 is operating at a temperature $T_0$, and a power management routine (e.g., executed by power management circuitry, such as power management circuitry 144 of FIG. 9) determines the body bias tuning voltage $V_{bb0}$ of island_0 should be reduced, for example, to reduce the likelihood of a malfunction by island_0. Similarly, island_3 is operating at a temperature $T_3$, and a power management routine (e.g., executed by power management circuitry, such as power management circuitry 144 of FIG. 9) determines the body bias tuning voltage $V_{bb3}$ of island_3 should be reduced, for example, to reduce the likelihood of a malfunction by island_3. Conversely, island_1 is operating at a temperature $T_1$, and a power management routine (e.g., executed by power management circuitry, such as power management circuitry 144 of FIG. 9) determines the body bias tuning voltage $V_{bb1}$ of island_1 may be increased, for example, to improve the performance of island_1. Similarly, island_2 is operating at a temperature $T_2$, and a power management routine (e.g., executed by power management circuitry, such as power management circuitry 144 of FIG. 9) determines the body bias tuning voltage $V_{bb2}$ of island_2 may be increased, for example, to improve the performance of island_2.

Figure 24:
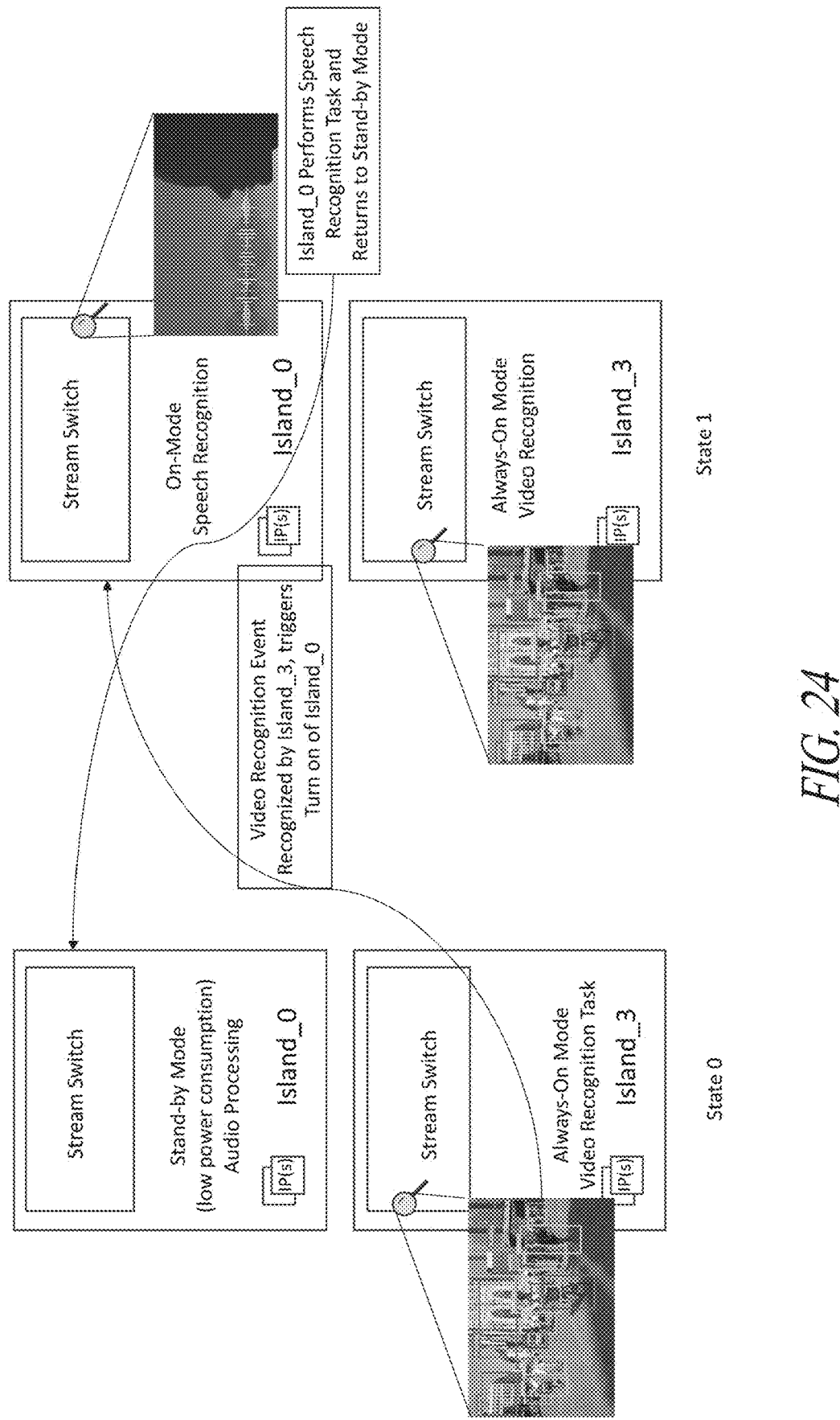
FIG. 24 is a conceptual diagram illustrating an example application of independent event-based real-time power tuning to individual islands of a plurality of islands coupled together using an interconnection mesh.

FIG. 24 is another conceptual diagram illustrating an application of independent real-time power tuning to individual islands of a plurality of islands coupled together using an interconnection mesh in the context of event-based power management. As illustrated, in a first state State 0, island_0 is in a stand-by mode of an audio processing task (e.g., speech recognition), such as a low power mode, and island_3 is in an always-on mode of a video recognition task. The video recognition task recognizes an event, and the recognition of the event triggers a turn-on of island_0 (e.g., by a power management routine executed by power management circuitry, such as power management circuitry 144 of FIG. 9), and a transition to a second state State 1. As illustrated, in the second state State 1, island_0 is in an on mode of the audio processing task and performs speech recognition in response to the event. Island_3 continues in the always-on mode of the video recognition task. When island_0 has completed the speech recognition task, island_0 transitions back to the first state State 0, and enters a stand-by mode of operation.

Figure 25:
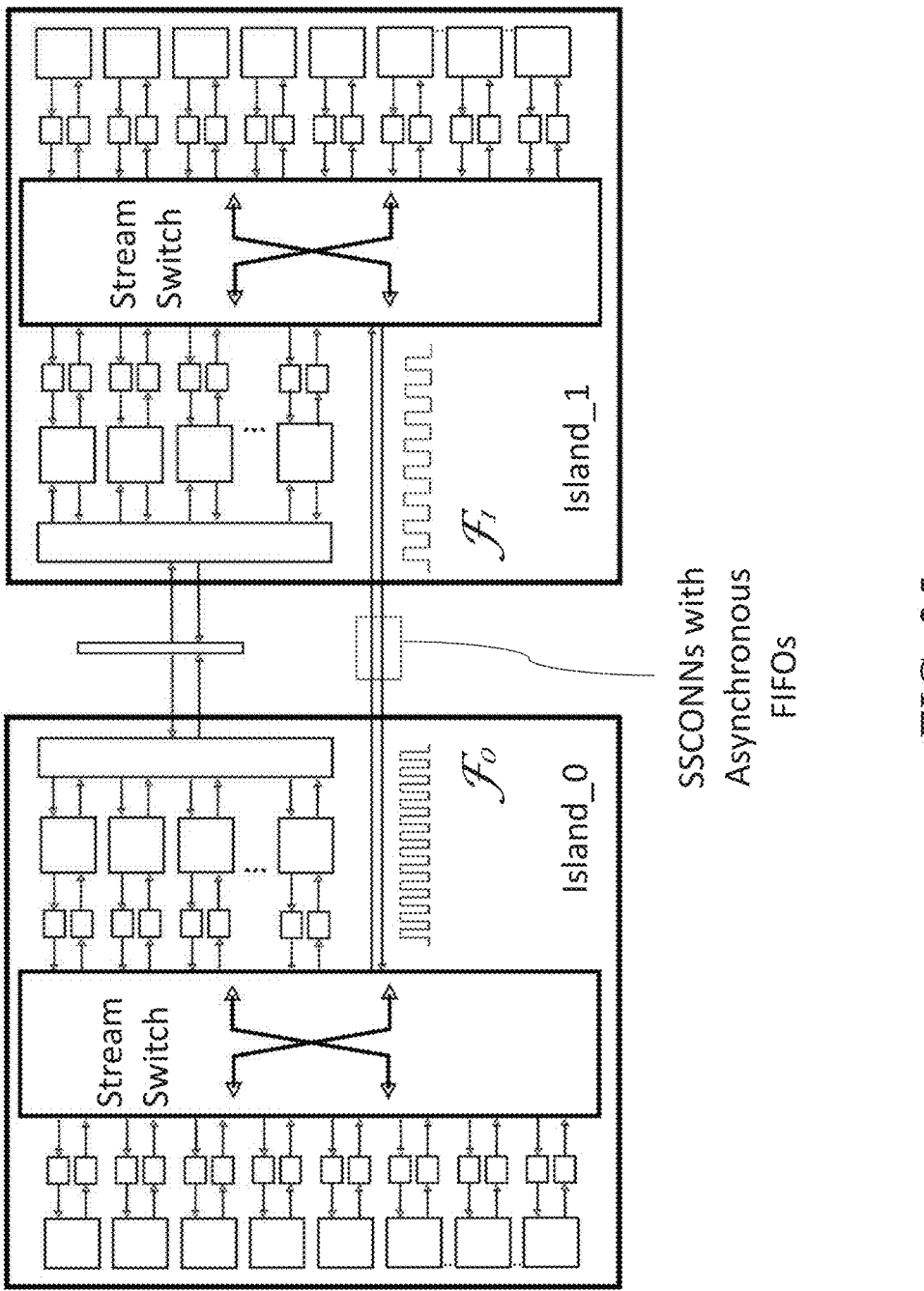
FIG. 25 is a conceptual diagram illustrating an example of use of asynchronous FIFOs in SSCONNs of an interconnection mesh to facilitate independent clocking of islands of a plurality of accelerator islands coupled together using the interconnection mesh.

FIG. 25 is a conceptual diagram illustrating the use of asynchronous FIFOs in SSCONNs of an interconnection mesh to facilitate independent clocking of islands of a plurality of accelerator islands coupled together using the interconnection mesh. The plurality of hardware accelerator islands may be implemented using a locally synchronous and globally asynchronous design. In operation, the asynchronous FIFOs of the SSCONNs synchronize data streams transmitted between the stream switches of islands operating using different clocks or different clocking frequencies.

Figure 26:
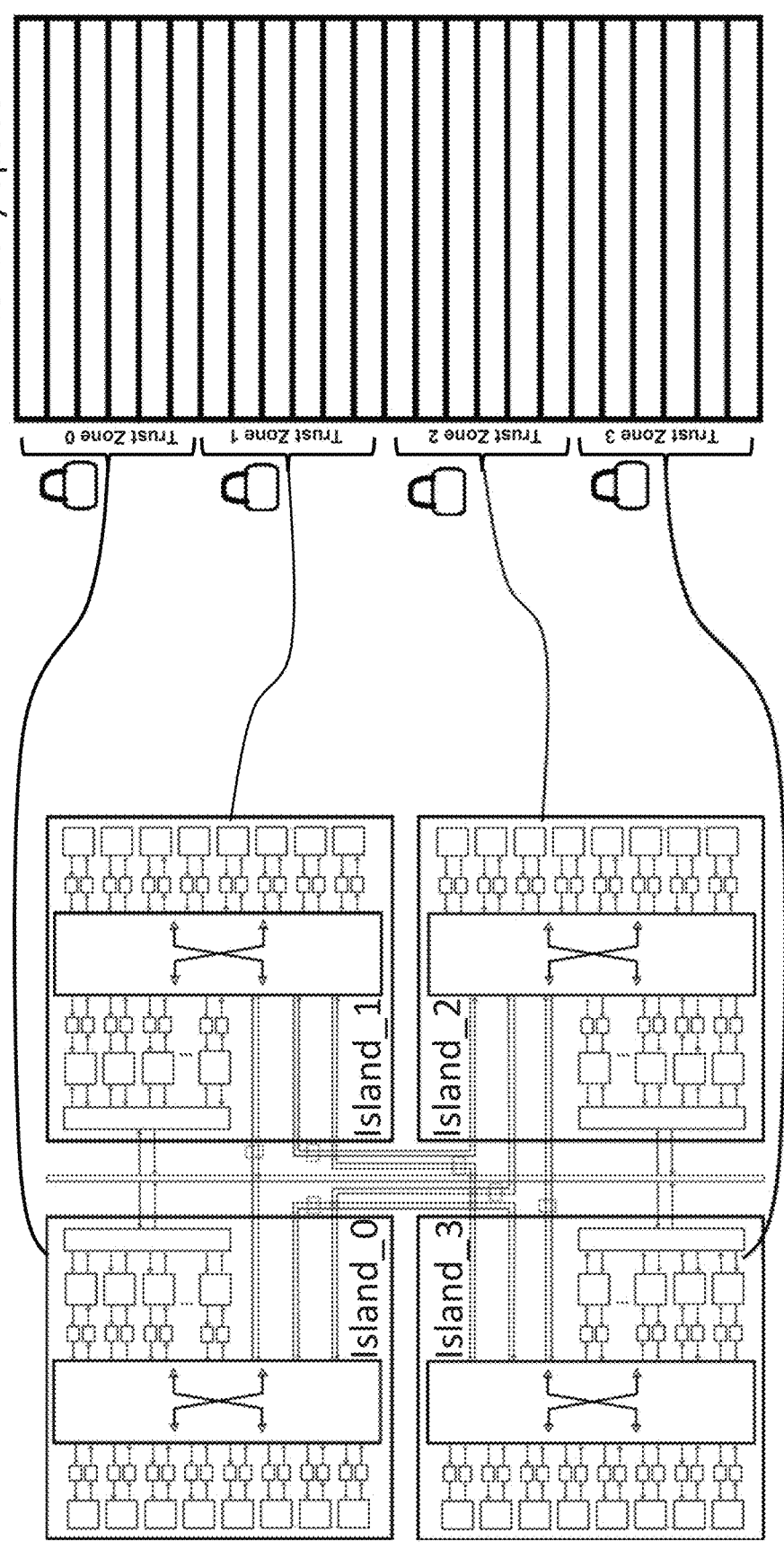
FIG. 26 is a conceptual diagram illustrating an example application of multiple security regions to accelerator islands coupled together using an interconnection mesh.

FIG. 26 is a conceptual diagram illustrating an example application of multiple security regions or zones to accelerator islands coupled together using an interconnection mesh. As illustrated, an accelerator system has four accelerator islands island_0, island_1, island_2 and island_3. The islands are coupled together using an interconnection mesh (see interconnection mesh 151 of FIG. 1). The accelerator system may be segmented into multiple security regions or zones, for example, based on an ID on a configuration bus. A memory space (e.g., dedicated to the accelerator islands of the accelerator system, or a system memory) may be divided into a plurality of trust zones. Each trust zone may be associated with one or more islands of the accelerator system, and access to the trust zone by other islands may be restricted. For example, trust zone 0 may store kernel data associated with a recognition process being executed on island_0, and the kernel data may be protected by restricting access to trust zone 0 by islands other than island_0, such as island_1, island_2 and island_3. As illustrated, island_0 is associated with trust zone 0, island_1 is associated with trust zone 1, island_2 is associated with trust zone 2, and island_3 is associated with trust zone 3.

Figure 27:
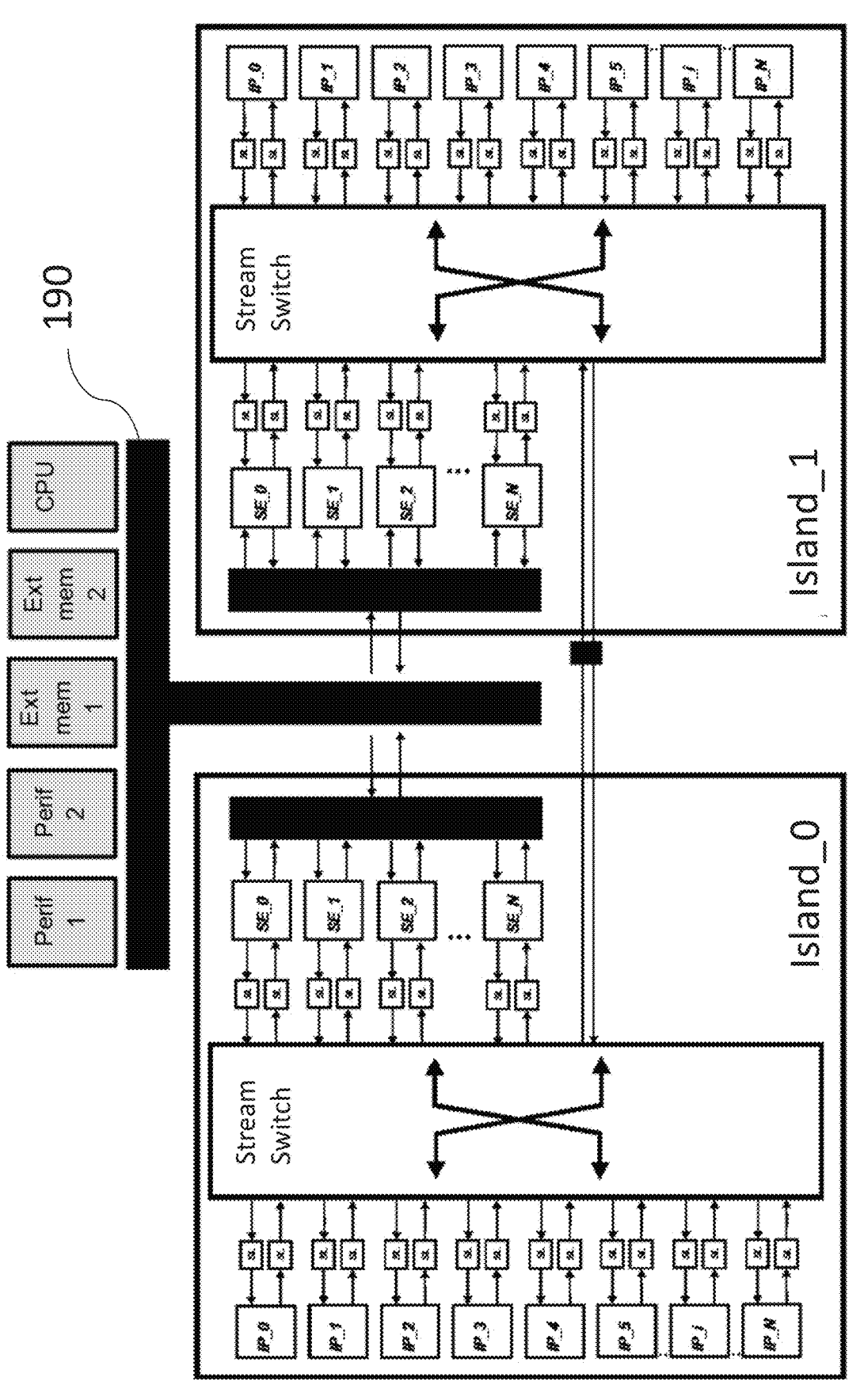
FIGS. 27 and 28 are conceptual diagrams illustrating examples of coupling accelerator islands to one or more system busses.
Figure 28:
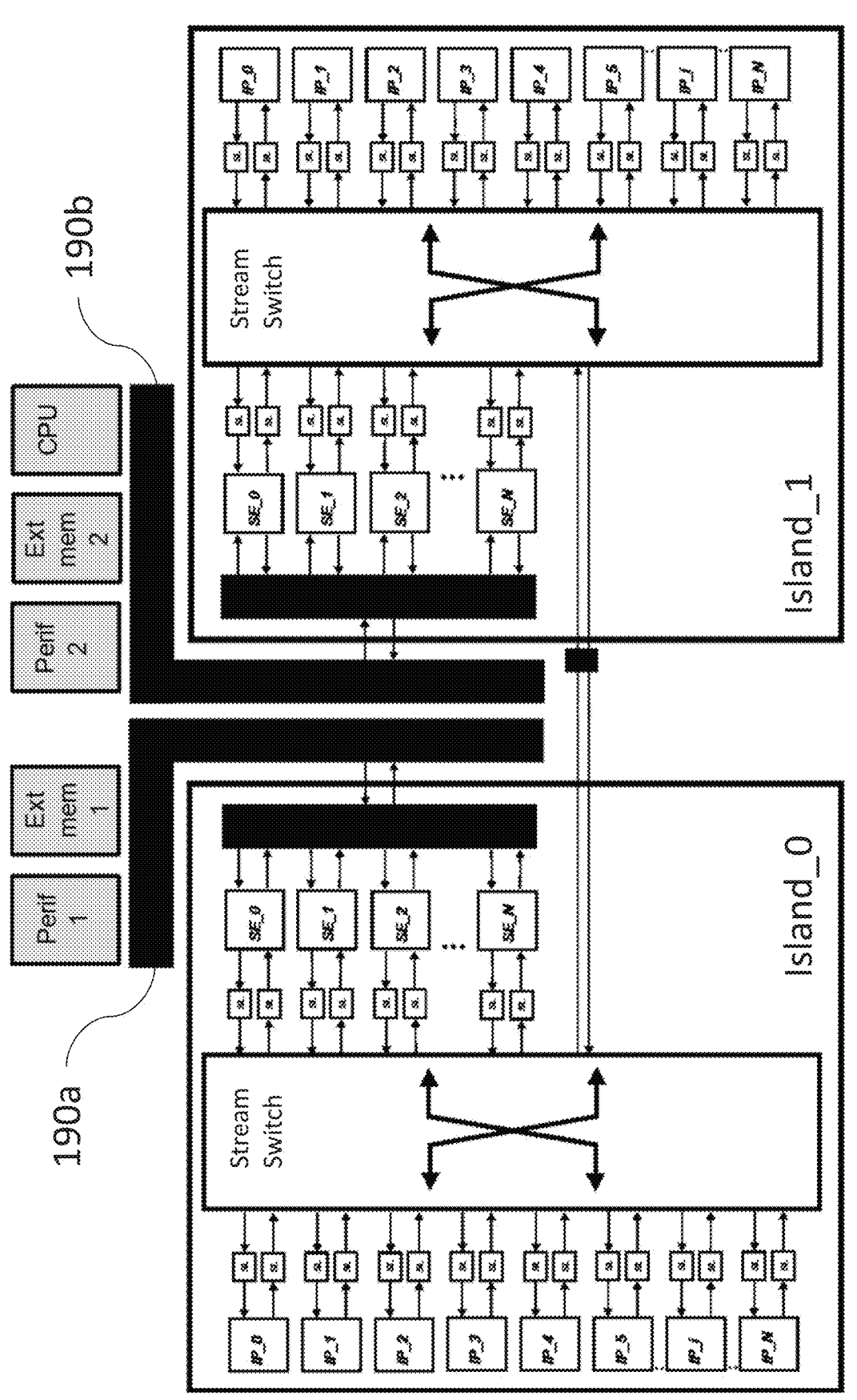

FIGS. 27 and 28 are conceptual diagrams illustrating examples of coupling accelerator islands of an accelerator system to one or more system busses. In FIG. 27, a single bus system 190 is independently coupled to each of the islands of the accelerator system (e.g., via DMAs and bus interfaces, such as the DMAs 170 and bus interfaces 172 of FIG. 9). In FIG. 28, the accelerator system has two system busses 190a, 190b. As illustrated, island_0 is coupled to a first system bus 190a of the accelerator system (e.g., via DMA and bus interfaces of island_0), and the first system bus 190a facilitates access by island_0 to a first peripheral, and to a first external memory. Island_1 is coupled to a second system bus 190*b* of the accelerator system (e.g., via DMA and bus interfaces of island_1), and the second system bus 190*b* facilitates access by island_1 to a second peripheral, a second external memory and to a CPU, such as a host CPU. In both cases, data streams generated by a processing element of one of the islands (e.g., island_0) may be provided to a processing element of the other island (e.g., island_1) via an interconnection mesh 151, such as discussed above with reference to FIG. 19.

Figure 29:
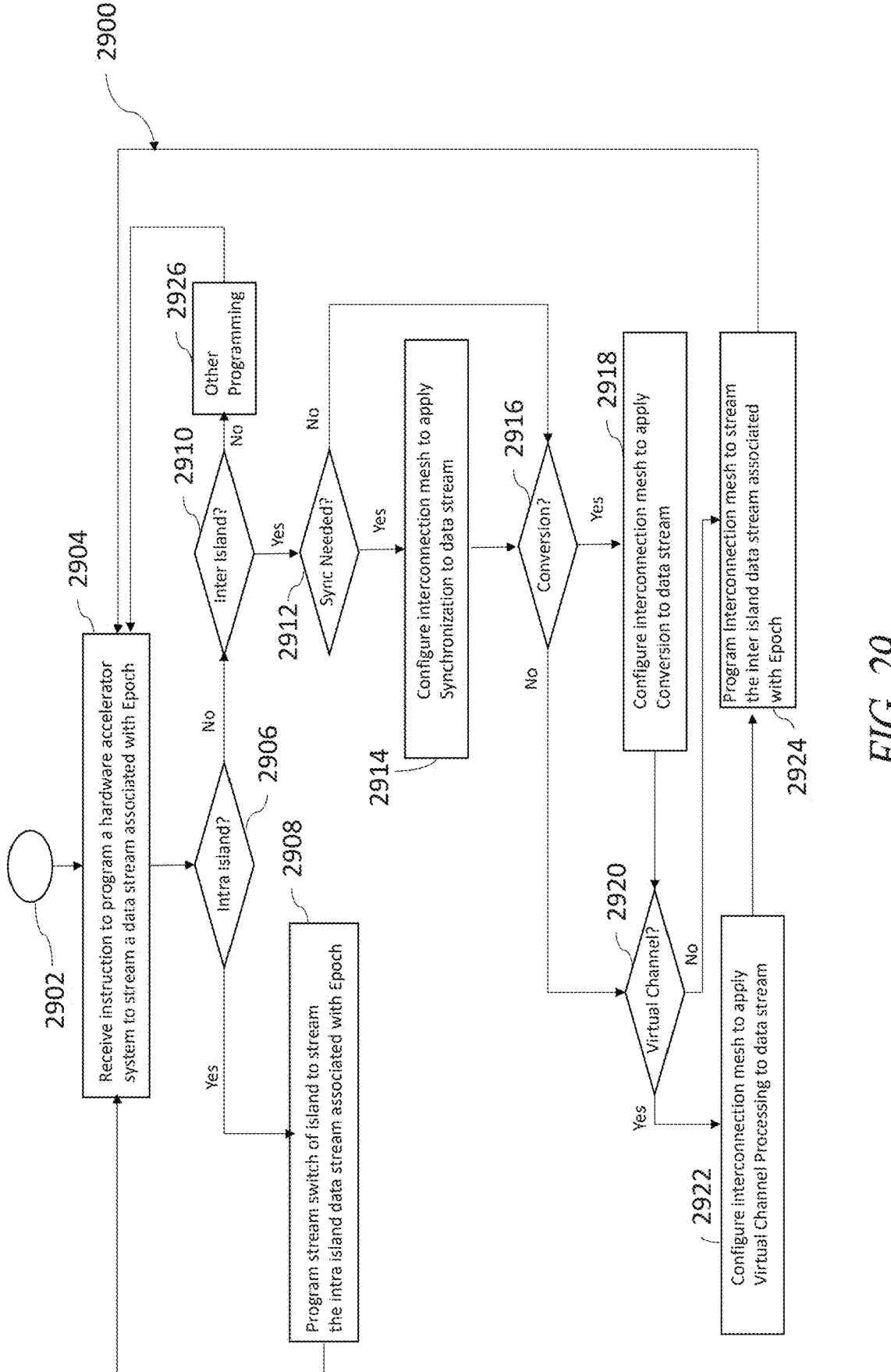
FIG. 29 is a flow diagram illustrating an embodiment of a process of programming an accelerator system including an interconnection mesh to stream data associated with execution of an epoch of a neural network.

FIG. 29 is a flow diagram illustrating an embodiment of a process or method 2900 of configuring or programming an accelerator system including an interconnection mesh to stream data associated with execution of an epoch of a neural network. For convenience, FIG. 29 will be described with reference to FIGS. 9-11.

The process 2900 may be called, for example, by a epoch management routine executing on processing circuitry (e.g., an epoch controller 122, a PE 128 of a hardware accelerator 120, the host processor 102 of FIG. 9, etc., and various combinations thereof), to program a hardware accelerator system having a plurality of accelerator islands coupled together via a reconfigurable interconnection mesh, such as the interconnection mesh 151 of the hardware accelerator system 118 of FIG. 9, the interconnection mesh 251 of the hardware accelerator system 218 of FIG. 10, etc., to process an epoch of a neural network, including programming the hardware accelerator system to stream data during the processing the epoch of the neural network. The process 2900 may typically be performed at runtime before processing each epoch of a neural network.

At 2902, the method 2900 starts, and proceeds to 2904. At 2904, the method 2900 receives an instruction to program a hardware accelerator system to stream a data stream associated with execution of an epoch of a neural network. The method 2900 proceeds from 2904 to 2906.

At 2906, the method 2900 determines whether the instruction is associated with an intra island streaming operation associated with a sending device and a receiving device of a single hardware accelerator island, such as an island 120 of FIG. 9. This may be done based on the sending and receiving devices associated with the instruction.

When it is determined that the instruction is associated with an intra island streaming operation, the method 2900 proceeds from 2906 to 2908, where the hardware accelerator system is programmed to stream the intra island data stream using a stream switch of an island associated with the instruction. The method 2900 proceeds from 2908 to 2902, for example, to wait for another instruction to program the hardware accelerator system to stream a data stream associated with the epoch. When it is not determined at 2906 that the instruction is associated with an intra island steaming operation, the method 2900 proceeds from 2906 to 2910.

At 2910, the method 2900 determines whether the instruction is associated with an inter island streaming operation associated with a sending device and a receiving device associated with different hardware accelerator islands, such as multiple islands 120 of FIG. 9. This may be done based on whether the sending and receiving devices associated with the instruction are associated with different hardware accelerator islands. When it is determined that the instruction is associated with an inter island streaming operation, the method 2900 proceeds from 2910 to 2912.

When it is not determined at 2910 that the instruction is associated with an inter island streaming operation, the method 2900 proceeds from 2910 to 2926, where other programming may be applied based on the instruction (e.g., programming a hardware accelerator island 120 to retrieve a data stream from an external memory). The method 2900 proceeds from 2926 to 2902, for example, to wait for another instruction to program the hardware accelerator system to stream a data stream associated with the epoch.

At 2912, the method 2900 determines whether to program an SSCONN of an interconnection mesh to apply synchronization to a data stream associated with the instruction. This may be determined, for example, based on whether the different hardware accelerator islands 120 associated with the instruction are independently clocked. When it is determined to configure an SSCONN of the interconnection mesh to apply synchronization, the method 2900 proceeds from 2912 to 2914, where the SSCONN is configured or programmed to apply synchronization to the data stream. The method 2900 proceeds from 2914 to 2916. When it is not determined at 2912 to configure the SSCONN to apply synchronization, the method 2900 proceeds from 2912 to 2916.

At 2916, the method 2900 determines whether to configure an SSCONN of an interconnection mesh to apply data conversion to a data stream associated with the instruction. This may be determined, for example, based on whether the stream switches of the different hardware accelerator islands 120 associated with the instruction employ different data channel configurations, such as discussed above with reference to FIG. 20. When it is determined to configure an SSCONN of the interconnection mesh to apply data conversion, the method 2900 proceeds from 2916 to 2918, where the SSCONN is configured to apply data conversion to the data stream associated with the instruction. The method proceeds from 2918 to 2920. When it is not determined at 2916 to configure the SSCONN to apply data conversion, the method 2900 proceeds from 2916 to 2920.

At 2920, the method 2900 determines whether to configure an SSCONN of an interconnection mesh to apply virtual channel processing to a data stream associated with the instruction. This may be determined, for example, based on whether the stream switches of the different hardware accelerator islands 120 associated with the instruction provide different levels of virtual channel support, such as discussed above with reference to FIG. 20. When it is determined to configure an SSCONN of the interconnection mesh to apply virtual channel processing, the method 2900 proceeds from 2920 to 2922, where the SSCONN is configured to apply virtual channel processing to the data stream associated with the programming request. The method proceeds from 2922 to 2924. When it is not determined at 2920 to configure the SSCONN to apply virtual channel processing, the method 2900 proceeds from 2920 to 2924.

At 2924, the hardware accelerator system is programmed to stream the inter island data stream using the interconnection mesh of the hardware accelerator system. Typically, the interconnection mesh may be programmed to stream data through a stream switch of a hardware accelerator island associated with the sending device, a configured SSCONN, and a stream switch associated with a hardware accelerator island of the receiving device. For some data streams, the interconnection mesh may be programmed to stream data through intermediate hardware accelerator islands and SSCONNs. For example, with reference to FIG. 16, the interconnection mesh may be programmed to stream data associated with a sending processing element of island ISL0 and a receiving processing element of island ISL2 through the stream switch of island ISL1, and SSCONNs coupling the stream switch of island ISL1 to islands ISL0 and ISL2. The method 2900 proceeds from 2924 to 2902, for example, to wait for another request to program the hardware accelerator system to stream a data stream associated with the Epoch.

Figure 30:
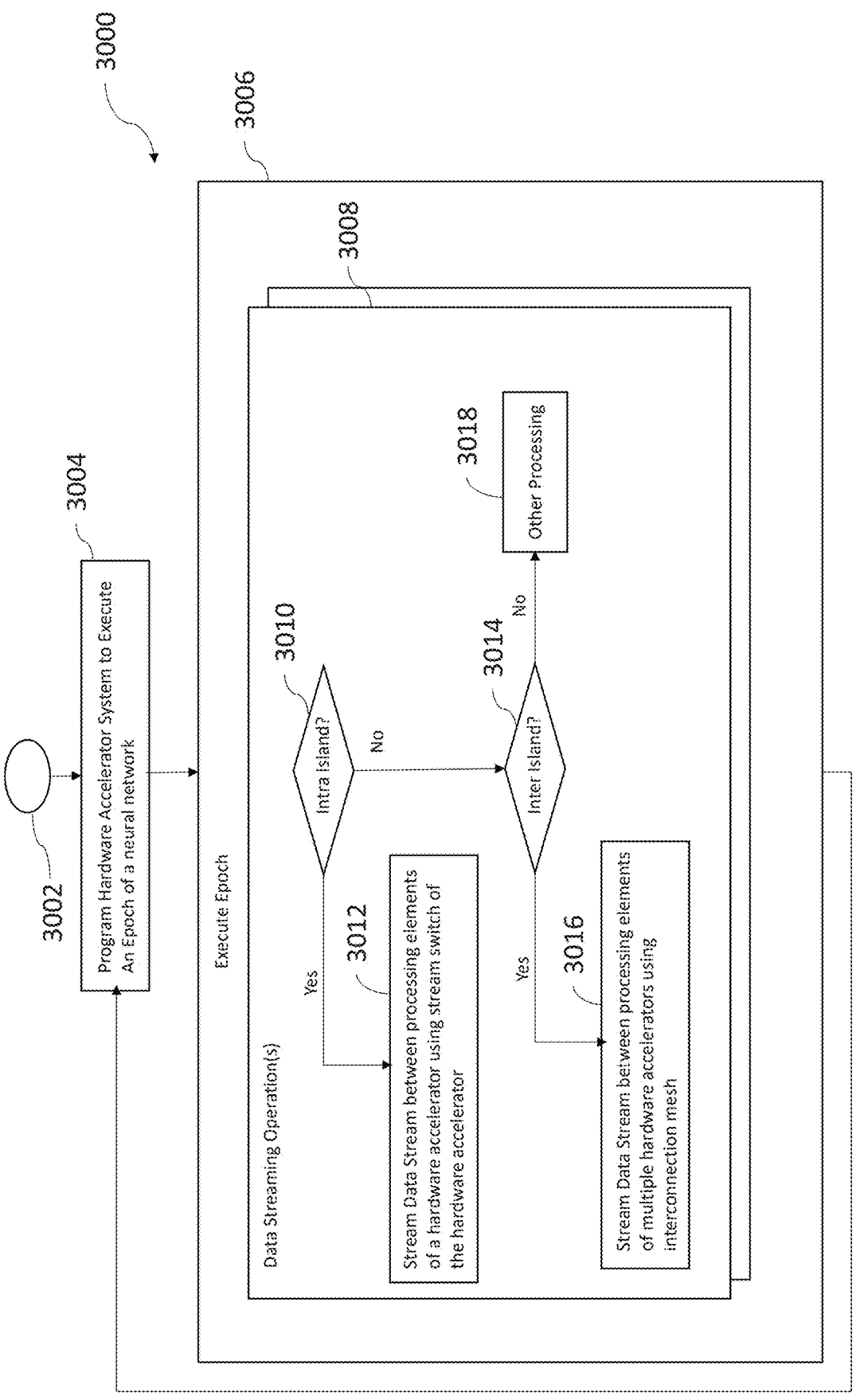
FIG. 30 is a flow diagram illustrating an embodiment of a process of executing a neural network using a hardware accelerator system including an interconnection mesh.

FIG. 30 is a flow diagram illustrating an embodiment of a process or method 3000 of executing a neural network using a hardware accelerator system including a plurality of accelerator islands and an interconnection mesh. For convenience FIG. 30 will be described with references to FIGS. 9-11 and 29. The method 3000 may be called, for example, by a host processor executing a neural network using one or more hardware accelerator islands of a plurality of hardware accelerator islands coupled together using a reconfigurable interconnection mesh, such as the interconnection mesh 151 of the hardware accelerator system 118 of FIG. 9, the interconnection mesh 251 of the hardware accelerator system 218 of FIG. 10, etc.

At 3002, the method 3000 starts, and proceeds to 3004. At 3004, the method 3000 programs a hardware accelerator system to perform processing tasks, including data streaming tasks, associated with a processing epoch of a neural network. This may be done, for example, by a host processor 102 of FIG. 9 using the method 2900 of FIG. 29 to program a hardware accelerator system, possibly together with other programming techniques or processes. The method 3000 proceeds from 3004 to 3006.

At 3006, the method 3000 executes the epoch, which includes performing processing tasks associated with the epoch using the hardware accelerator system programmed at 3004. The processing tasks typically include a plurality of data streaming operations 3008, which may be performed in parallel, in series, interactively, and various combinations thereof.

As illustrated, performing a data streaming operation at 3008 begins at 3010, where the method 3000 determines whether the data streaming operation is an intra island operation associated with a sending device and a receiving device of a single hardware accelerator island, such as an island 120 of FIG. 9. This may be done based on configuration settings associated with the data streaming operation, such as configuration settings programmed during act 2908 or act 2924 of FIG. 29.

When it is determined that the data streaming operation is an intra island streaming operation, the method 3000 proceeds from 3010 to 3012, where the data streaming operation is performed using a programmed stream switch of an island associated with the data streaming operation. When it is not determined at 3010 that the data streaming operation is an intra island streaming operation, the method 3000 proceeds from 3010 to 3014.

At 3014, the method 3000 determines whether the data streaming operation is an inter island streaming operation associated with a sending device and a receiving device associated with different hardware accelerator islands, such as multiple islands 120 of FIG. 9. This may be done based on settings associated with the data streaming operation, such as configuration settings programmed during act 2908 or act 2924 of FIG. 29. When it is determined that the data streaming operation is an inter island streaming operation, the method 3000 proceeds from 3014 to 3016. When it is not determined at 3014 that the data streaming operation is an inter island data streaming operation, the method 3000 proceeds from 3014 to 3018, where other processing may be applied to perform the data streaming operation (e.g., a data stream may be retrieved from an external memory via the bus system 190).

After the execution of the epoch at 3006 is completed, the process 3000 returns to 3004 to program the hardware accelerator system to execute a subsequent epoch of the neural network.

Embodiments of the foregoing processes and methods may contain additional acts not shown in FIG. 29 and FIG. 30, may not contain all of the acts shown in FIG. 29 and FIG. 30, may perform acts shown in FIG. 29 and FIG. 30 in various orders, may combine acts, may split acts into separate acts, may perform acts in parallel or sequentially, and may be otherwise modified in various respects. For example, FIG. 29 may be modified to include a check as to whether the request to program a hardware accelerator to stream a data stream is invalid (e.g., a check as to whether the request is associated with the streaming of data between hardware islands in different security zones). In another example, FIG. 30 may be modified to include a check as to whether there are additional epochs in the neural network to be programmed and executed before returning to 3004 from 3006. In another example, acts 2906 and 2910 of FIG. 29, or acts 3010 and 3014 of FIG. 30, may be combined in some embodiments.

In an embodiment, a device includes a plurality of hardware accelerator islands. The accelerator islands have a plurality of processing elements, a plurality of streaming engines, and a stream switch coupled to the plurality of processing elements and to the plurality of streaming engines. The stream switch streams data between the plurality of processing elements of the accelerator island, and between the plurality of streaming engines of the accelerator island and the plurality of processing elements of the accelerator island. Unidirectional stream switch connections (SS-CONNs) are coupled between pairs of stream switches of the plurality of accelerator islands. The stream switches of the plurality of hardware accelerator islands and the SSCONNs form a run-time reconfigurable interconnection mesh between the plurality of processing elements of the plurality of hardware accelerator islands. In operation, the interconnection mesh streams data between processing elements of multiple hardware accelerator islands of the plurality of hardware accelerator islands.

In an embodiment, the device comprises: a plurality of unidirectional stream links including: unidirectional stream links coupled between processing elements and stream switches of respective hardware accelerator islands of the plurality of hardware accelerator islands; and unidirectional stream links coupled between a SSCONN and stream switches of a pair of stream switches coupled together by the SSCONN.

In an embodiment, at least one SSCONN includes an asynchronous first-in-first-out (FIFO) buffer, which, in operation, synchronizes data streamed via the at least one SSCONN between stream switches of hardware accelerator islands operating with different clocks. In an embodiment, at least one of the SSCONNs includes stream link conversion circuitry, which, in operation, coverts data streamed via the at least one SSCONN between stream switches of the hardware accelerator islands operating with different data widths, with different channel configurations, or with different data widths and different channel configurations. In an embodiment, at least one of the SSCONNs includes virtual channel control circuitry, which, in operation, adds or removes virtual channel support to data streams streamed via the at least one SSCONN between stream switches providing different levels of virtual channel support.

In an embodiment, each of the plurality of hardware accelerator islands is coupled to each of the other hardware accelerator islands of the plurality of hardware accelerator islands via one or more SSCONNs.

In an embodiment, one of the plurality of hardware accelerator islands has a different number of processing elements than another of the plurality of hardware accelerator island.

In an embodiment, in operation, a first set of hardware accelerator islands of the plurality of hardware accelerator islands executes one or more tasks of a first neural network in parallel with execution of one or more tasks of a second neural network by a second set of hardware accelerator islands of the plurality of hardware accelerator islands. In an embodiment, in operation, multiple hardware accelerator islands of the plurality of accelerator islands process batches of a neural network task in parallel.

In an embodiment, wherein, the interconnection mesh, in operation, streams data in parallel between a processing element of a hardware accelerator island of the plurality of hardware accelerator islands and multiple other processing elements coupled to the interconnection mesh.

In an embodiment, the device comprises power control circuitry, which, in operation, applies real-time power tuning to individual hardware accelerator islands of the plurality of hardware accelerator islands. In an embodiment, in operation, the real-time power tuning is applied based on: detection of events by processes executing on hardware accelerator islands of the plurality of hardware accelerator island; types of processes being executed by respective hardware accelerator islands of the plurality of hardware accelerator islands; operating environment conditions; or various combinations thereof. In an embodiment, in operation, the applying real-time power tuning includes: independently controlling operating frequencies of hardware accelerator islands of the plurality of hardware accelerator islands; independently controlling supply voltages of hardware accelerator islands of the plurality of hardware accelerator islands; independently controlling body-bias voltages of hardware accelerator islands of the plurality of hardware accelerator islands; independently controlling operational states of hardware accelerator islands of the plurality of hardware accelerator islands; or various combinations thereof.

In an embodiment, in operation, the plurality of hardware accelerator islands are organized into multiple security regions on a hardware accelerator island basis. In an embodiment, the organizing of the plurality of hardware accelerator islands into multiple security regions is based on configuration bus ID associated with respective hardware accelerator islands of the plurality of hardware accelerator islands.

In an embodiment, each of the hardware accelerator islands of the plurality of hardware accelerator islands includes a bus interface, which, in operation, couples the hardware accelerator island to a host system bus. In an embodiment, the bus interface of a first hardware accelerator island of the plurality of hardware accelerator islands, in operation, couples the first hardware accelerator island to a first host system bus; and the bus interface of a second hardware accelerator island of the plurality of hardware accelerator islands, in operation, couples the second hardware accelerator island to a second host system bus. In an embodiment, the interconnection mesh, in operation, streams data from a processing element of the first hardware accelerator island to a processing element of the second hardware accelerator island.

In an embodiment, the run-time reconfigurable interconnection mesh, in operation, employs synchronizing mechanisms and back-pressure signaling.

In an embodiment, a system comprises a memory, a host processor coupled to the memory, a host system bus, a plurality of hardware accelerator islands coupled to the host system bus, and a plurality of unidirectional stream switch connections (SSCONNs). Each of the plurality of hardware accelerator islands includes: a plurality of processing elements; a plurality of streaming engines; and a stream switch coupled to the plurality of processing elements and to the plurality of streaming engines. The stream switch, in operation, streams data between the plurality of processing elements of the hardware accelerator island, and between the plurality of streaming engines of the hardware accelerator island and the plurality of processing elements of the hardware accelerator island. The plurality of SSCONNs are coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. In operation, the interconnection mesh streams data between processing elements of multiple hardware accelerator islands of the plurality of hardware accelerator islands.

In an embodiment, the plurality of hardware accelerator islands are independently clocked, and at least one SSCONN includes an asynchronous first-in-first-out (FIFO) buffer, which, in operation, synchronizes data streamed via the at least one SSCONN between stream switches of hardware accelerator islands operating with different clocks.

In an embodiment, the system comprises power control circuitry, which, in operation, applies real-time power tuning to individual hardware accelerator islands of the plurality of hardware accelerator islands.

In an embodiment, in operation, the plurality of hardware accelerator islands are organized into multiple security regions on a hardware accelerator island basis.

In an embodiment, the run-time reconfigurable interconnection mesh, in operation, employs synchronizing mechanisms and back-pressure signaling.

In an embodiment, a method comprises executing a first neural network on a plurality of hardware accelerator islands. The plurality of hardware accelerators are coupled together using a plurality of unidirectional stream switch connections (SSCONNs). Each hardware accelerator island includes: a plurality of processing elements; a plurality of streaming engines; and a stream switch coupled to the plurality of processing elements and to the plurality of streaming engines. The SSCONNs are coupled between pairs of stream switches of the plurality of hardware accelerator islands, and the stream switches of the plurality of hardware accelerator islands and the SSCONNs form a run-time reconfigurable interconnection mesh between the plurality of processing elements of the plurality of hardware accelerator islands. The executing the first neural network includes: streaming data between processing elements of a hardware accelerator of the plurality of hardware accelerators using a stream switch of the hardware accelerator of the plurality of hardware accelerators; and streaming data between processing elements of multiple hardware accelerator islands of the plurality of hardware accelerator islands via the run-time reconfigurable interconnection mesh.

In an embodiment, executing the first neural network includes streaming data between a processing element and a streaming engine of a hardware accelerator island of the plurality of hardware accelerator islands via the stream switch of the hardware accelerator island of the plurality of hardware accelerator islands.

In an embodiment, streaming data between processing elements of multiple hardware accelerator islands of the plurality of hardware accelerator islands via the run-time reconfigurable interconnection mesh includes synchronizing data streamed via SSCONNs between stream switches of hardware accelerator islands operating with different clocks.

In an embodiment, streaming data between processing elements of multiple hardware accelerator islands of the plurality of hardware accelerator islands via the run-time reconfigurable interconnection mesh includes converting data streamed via SSCONNs between stream switches of the hardware accelerator islands operating with different data widths, with different channel configurations, or with different data widths and different channel configurations.

In an embodiment, streaming data between processing elements of multiple hardware accelerator islands of the plurality of hardware accelerator islands via the run-time reconfigurable interconnection mesh includes adding or removing virtual channel support in data streams streamed via SSCONNs between stream switches providing different levels of virtual channel support.

In an embodiment, the method comprises executing a second neural network in parallel with the execution of the first neural network, wherein a first set of hardware accelerator islands of the plurality of hardware accelerator islands executes the first neural network in parallel with execution of the second neural network by a second set of hardware accelerator islands of the plurality of hardware accelerator islands.

In an embodiment, executing the first neural network includes processing batches of data associated with the first neural network in parallel using multiple hardware accelerator islands of the plurality of hardware accelerator islands.

In an embodiment, executing the first neural network includes streaming data via the reconfigurable interconnection mesh in parallel between a processing element of a hardware accelerator island of the plurality of hardware accelerator islands and multiple other processing elements coupled to the interconnection mesh.

In an embodiment, the method comprises applying real-time power tuning to individual hardware accelerator islands of the plurality of hardware accelerator islands during execution of the neural network task.

In an embodiment, the method comprises organizing the plurality of hardware accelerator islands into multiple security regions on a hardware accelerator island basis.

In an embodiment, the method comprises coupling one or more of the plurality of hardware accelerator islands to a host system bus.

In an embodiment, the streaming data comprises employing synchronizing mechanisms and back-pressure signaling.

In an embodiment, a non-transitory computer-readable medium's contents configure processing circuitry to perform a method. The method comprises executing a neural network on a plurality of hardware accelerator islands. The plurality of hardware accelerators are coupled together using a plurality of unidirectional stream switch connections (SS-CONNs). Each hardware accelerator island includes: a plurality of processing elements; a plurality of streaming engines; and a stream switch coupled to the plurality of processing elements and to the plurality of streaming engines. The SSCONNs are coupled between pairs of stream switches of the plurality of hardware accelerator islands, and the stream switches of the plurality of hardware accelerator islands and the SSCONNs form a run-time reconfigurable interconnection mesh between the plurality of processing elements of the plurality of hardware accelerator islands. The executing the neural network includes: streaming data between processing elements of a hardware accelerator of the plurality of hardware accelerators using a stream switch of the hardware accelerator of the plurality of hardware accelerators; and streaming data between processing elements of multiple hardware accelerator islands of the plurality of hardware accelerator islands via the run-time reconfigurable interconnection mesh. In an embodiment, the contents comprise instructions executable by the processing circuitry.

In an embodiment, a device, comprises memory and processing circuitry coupled to the memory. The memory, in operation, stores instructions. The processing circuitry, in operation, executes the instructions to program a hardware accelerator system to process an epoch of a neural network. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process an epoch of a neural network includes programming a stream switch of an island to stream an intra island data stream associated with the epoch, and programming the reconfigurable interconnection mesh to stream an inter island data stream associated with the epoch.

In an embodiment, the interconnection mesh comprises a plurality of unidirectional stream links including unidirectional stream links coupled between processing elements and stream switches of respective hardware accelerator islands of the plurality of hardware accelerator islands, and unidirectional stream links coupled between a SSCONN and stream switches of a pair of stream switches coupled together by the SSCONN.

In an embodiment, at least one SSCONN includes an asynchronous first-in-first-out (FIFO) buffer, and the programming the reconfigurable interconnection mesh to stream an inter island data stream includes programming the at least one SSCONN to synchronize data streamed via the at least one SSCONN between stream switches of hardware accelerator islands operating with different clocks.

In an embodiment, at least one of the SSCONNs includes stream link conversion circuitry, and the programming the reconfigurable interconnection mesh to stream an inter island data stream includes programming the stream link conversion circuitry to covert data streamed via the at least one SSCONN between stream switches of the hardware accelerator islands operating with different data widths, with different channel configurations, or with different data widths and different channel configurations.

In an embodiment, at least one of the SSCONNs includes virtual channel control circuitry, and the programming the reconfigurable interconnection mesh to stream an inter island data stream includes programming the virtual channel control circuitry to add or remove virtual channel support to the data stream streamed via the at least one SSCONN between stream switches providing different levels of virtual channel support.

In an embodiment, each of the plurality of hardware accelerator islands is coupled to each of the other hardware accelerator islands of the plurality of hardware accelerator islands via one or more SSCONNs.

In an embodiment, programming the hardware accelerator system to process an epoch of a neural network includes programming multiple hardware accelerator islands of the plurality of accelerator islands to process batches of a neural network task in parallel.

In an embodiment, programming the reconfigurable interconnection mesh to stream an inter island data stream associated with the epoch includes programming the interconnection mesh to stream data in parallel between a processing element of a hardware accelerator island of the plurality of hardware accelerator islands and multiple other processing elements coupled to the interconnection mesh.

In an embodiment, the processing circuitry, in operation, executes the instructions to program the hardware accelerator system to apply real-time power tuning to individual hardware accelerator islands of the plurality of hardware accelerator islands.

In an embodiment, the plurality of hardware accelerator islands are organized into multiple security regions on a hardware accelerator island basis.

In an embodiment, the programming the hardware accelerator system to process an epoch of a neural network includes storing configuration information into configuration registers of the hardware accelerator system.

In an embodiment, a device comprises a memory, processing circuitry coupled to the memory, a bus system, and a hardware accelerator system. The hardware accelerator system includes a plurality of hardware accelerator islands coupled to the bus system. Each hardware accelerator island includes a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The processing circuitry, in operation, programs the hardware accelerator system to process an epoch of a neural network. The programming the hardware accelerator system to process the epoch of the neural network includes programming a stream switch of an island to stream an intra island data stream associated with the epoch, and programming the reconfigurable interconnection mesh to stream an inter island data stream associated with the epoch.

In an embodiment, in operation, the plurality of hardware accelerator islands are independently clocked, at least one SSCONN includes an asynchronous first-in-first-out (FIFO) buffer, and programming the reconfigurable interconnection mesh to stream an inter island data stream associated with the epoch includes programming the at least one SSCONN to synchronize data streamed via the at least one SSCONN between stream switches of hardware accelerator islands operating with different clocks. In an embodiment, the run-time reconfigurable interconnection mesh, in operation, employs synchronizing mechanisms and back-pressure signaling.

In an embodiment, a method comprises programming a hardware accelerator system to execute an epoch of a neural network, and executing the epoch of the neural network using the programmed hardware accelerator system. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SSCONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process the epoch of the neural network includes programming a stream switch of a hardware accelerator island to stream an intra island data stream associated with the epoch, and programming the reconfigurable interconnection mesh to stream an inter island data stream associated with the epoch.

In an embodiment, executing the epoch of the neural network includes streaming data between a processing element and a streaming engine of the hardware accelerator island of the plurality of hardware accelerator islands via the programmed stream switch of the hardware accelerator island.

In an embodiment, executing the epoch of the neural network includes streaming data between processing elements of multiple hardware accelerator islands of the plurality of hardware accelerator islands via the programmed reconfigurable interconnection mesh.

In an embodiment, programming the reconfigurable interconnection mesh includes programming one or more SSCONNs to synchronize data streamed between stream switches of hardware accelerator islands operating with different clocks. In an embodiment, programming the reconfigurable interconnection mesh includes programming one or more SSCONNs to convert data streamed between stream switches of hardware accelerator islands operating with different data widths, with different channel configurations, or with different data widths and different channel configurations. In an embodiment, programming the reconfigurable interconnection mesh includes programming one or more SSCONNs to add or remove virtual channel support to data streams streamed between stream switches providing different levels of virtual channel support.

In an embodiment, programming the hardware accelerator system to execute the epoch of the neural network comprising organizing the plurality of hardware accelerator islands into multiple security regions on a hardware accelerator island basis.

In an embodiment, the executing the epoch of the neural network comprises employing synchronizing mechanisms and back-pressure signaling.

In an embodiment, a non-transitory computer-readable medium's contents configure processing circuitry to perform a method. The method comprises programming a hardware accelerator system to execute an epoch of a neural network, and executing the epoch of the neural network using the programmed hardware accelerator system. The hardware accelerator system includes a plurality of hardware accelerator islands, each hardware accelerator island including a plurality of processing elements, a plurality of streaming engines, and a stream switch coupled to the plurality of processing elements and to the plurality of streaming engines. The hardware accelerator system also includes a plurality of unidirectional stream switch connections (SS- CONNs) coupled between pairs of stream switches of the plurality of hardware accelerator islands. The stream switches of the plurality of hardware accelerator islands and the SSCONNs form a run-time reconfigurable interconnection mesh between the plurality of processing elements of the plurality of hardware accelerator islands. The programming the hardware accelerator system to process the epoch of the neural network includes programming a stream switch of a hardware accelerator island to stream an intra island data stream associated with the epoch, and programming the reconfigurable interconnection mesh to stream an inter island data stream associated with the epoch. In an embodiment, the contents comprise instructions executable by the processing circuitry.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a plurality of hardware accelerator islands, each including:
a plurality of processing elements;
a plurality of streaming engines; and
a stream switch coupled to the plurality of processing elements and to the plurality of streaming engines, wherein the stream switch, in operation, streams data between the plurality of processing elements of the hardware accelerator island, and between the plurality of streaming engines of the hardware accelerator island and the plurality of processing elements of the hardware accelerator island; and
a plurality of unidirectional stream switch connections (SSCONNs) coupled between pairs of stream switches of the plurality of hardware accelerator islands, wherein, the stream switches of the plurality of hardware accelerator islands and the SSCONNs form a run-time reconfigurable interconnection mesh between the plurality of processing elements of the plurality of hardware accelerator islands, and, in operation, the interconnection mesh streams data between processing elements of multiple hardware accelerator islands of the plurality of hardware accelerator islands, wherein at least one of the SSCONNs includes stream link conversion circuitry, which, in operation, coverts data streamed via the at least one SSCONN between stream switches of the hardware accelerator islands operating with different data widths, with different channel configurations, or with different data widths and different channel configurations.

2. The device of claim 1, comprising:
a plurality of unidirectional stream links including:
unidirectional stream links coupled between processing elements and stream switches of respective hardware accelerator islands of the plurality of hardware accelerator islands; and
unidirectional stream links coupled between a SSCONN and stream switches of a pair of stream switches coupled together by the SSCONN.

3. The device of claim 1, wherein at least one SSCONN includes an asynchronous first-in-first-out (FIFO) buffer, which, in operation, synchronizes data streamed via the at least one SSCONN between stream switches of hardware accelerator islands operating with different clocks.

4. The device of claim 1, wherein at least one of the SSCONNs includes virtual channel control circuitry, which, in operation, adds or removes virtual channel support to data streams streamed via the at least one SSCONN between stream switches providing different levels of virtual channel support.

5. The device of claim 1, wherein each of the plurality of hardware accelerator islands is coupled to each of the other hardware accelerator islands of the plurality of hardware accelerator islands via one or more SSCONNs.

6. The device of claim 1, wherein one of the plurality of hardware accelerator islands has a different number of processing elements than another of the plurality of hardware accelerator island.

7. The device of claim 1, wherein, in operation:
a first set of hardware accelerator islands of the plurality of hardware accelerator islands executes one or more tasks of a first neural network in parallel with execution of one or more tasks of a second neural network by a second set of hardware accelerator islands of the plurality of hardware accelerator islands.

8. The device of claim 1, wherein, in operation, multiple hardware accelerator islands of the plurality of accelerator islands process batches of a neural network task in parallel.

9. The device of claim 1, wherein, the interconnection mesh, in operation, streams data in parallel between a processing element of a hardware accelerator island of the plurality of hardware accelerator islands and multiple other processing elements coupled to the interconnection mesh.

10. The device of claim 1, comprising power control circuitry, which, in operation, applies real-time power tuning to individual hardware accelerator islands of the plurality of hardware accelerator islands.

11. The device of claim 10, wherein, in operation, the real-time power tuning is applied based on:
detection of events by processes executing on hardware accelerator islands of the plurality of hardware accelerator island;

types of processes being executed by respective hardware accelerator islands of the plurality of hardware accelerator islands;

operating environment conditions; or various combinations thereof.

12. The device of claim 10, wherein, in operation, the applying real-time power tuning includes:

independently controlling operating frequencies of hardware accelerator islands of the plurality of hardware accelerator islands;

independently controlling supply voltages of hardware accelerator islands of the plurality of hardware accelerator islands;

independently controlling body-bias voltages of hardware accelerator islands of the plurality of hardware accelerator islands;

independently controlling operational states of hardware accelerator islands of the plurality of hardware accelerator islands; or various combinations thereof.

13. The device of claim 1, wherein, in operation, the plurality of hardware accelerator islands are organized into multiple security regions on a hardware accelerator island basis.

14. The device of claim 13, wherein the organizing of the plurality of hardware accelerator islands into multiple security regions is based on configuration bus ID associated with respective hardware accelerator islands of the plurality of hardware accelerator islands.

15. The device of claim 1, wherein each of the hardware accelerator islands of the plurality of hardware accelerator islands includes a bus interface, which, in operation, couples the hardware accelerator island to a host system bus.

16. The device of claim 15, wherein, the bus interface of a first hardware accelerator island of the plurality of hardware accelerator islands, in operation, couples the first hardware accelerator island to a first host system bus; and the bus interface of a second hardware accelerator island of the plurality of hardware accelerator islands, in operation, couples the second hardware accelerator island to a second host system bus.

17. The device of claim 16, wherein the interconnection mesh, in operation, streams data from a processing element of the first hardware accelerator island to a processing element of the second hardware accelerator island.

18. The device of claim 1, wherein the run-time reconfigurable interconnection mesh, in operation, employs synchronizing mechanisms and back-pressure signaling.

19. A system, comprising:

a memory;

a host processor coupled to the memory;

a host system bus;

a plurality of hardware accelerator islands coupled to the host system bus, each including:

a plurality of processing elements;

a plurality of streaming engines; and a stream switch coupled to the plurality of processing elements and to the plurality of streaming engines, wherein the stream switch, in operation, streams data between the plurality of processing elements of the hardware accelerator island, and between the plurality of streaming engines of the hardware accelerator island and the plurality of processing elements of the hardware accelerator island; and a plurality of unidirectional stream switch connections (SSCONNs) coupled between pairs of stream switches of the plurality of hardware accelerator islands, wherein, the stream switches of the plurality of hardware accelerator islands and the SSCONNs form a run-time reconfigurable interconnection mesh between the plurality of processing elements of the plurality of hardware accelerator islands, and, in operation, the interconnection mesh streams data between processing elements of multiple hardware accelerator islands of the plurality of hardware accelerator islands, wherein at least one of the SSCONNs includes stream link conversion circuitry, which, in operation, coverts data streamed via the at least one SSCONN between stream switches of the hardware accelerator islands operating with different data widths, with different channel configurations, or with different data widths and different channel configurations.

20. The system of claim 19, wherein, in operation, the plurality of hardware accelerator islands are independently clocked, and at least one SSCONN includes an asynchronous first-in-first-out (FIFO) buffer, which, in operation, synchronizes data streamed via the at least one SSCONN between stream switches of hardware accelerator islands operating with different clocks.

21. The system of claim 19, comprising power control circuitry, which, in operation, applies real-time power tuning to individual hardware accelerator islands of the plurality of hardware accelerator islands.

22. The system of claim 19, wherein, in operation, the plurality of hardware accelerator islands are organized into multiple security regions on a hardware accelerator island basis.

23. The system of claim 19, wherein the run-time reconfigurable interconnection mesh, in operation, employs synchronizing mechanisms and back-pressure signaling.

24. A method, comprising:

executing a first neural network on a plurality of hardware accelerator islands, the plurality of hardware accelerators being coupled together using a plurality of unidirectional stream switch connections (SSCONNs), each hardware accelerator island including:

a plurality of processing elements;

a plurality of streaming engines; and a stream switch coupled to the plurality of processing elements and to the plurality of streaming engines, wherein the SSCONNs are coupled between pairs of stream switches of the plurality of hardware accelerator islands, and the stream switches of the plurality of hardware accelerator islands and the SSCONNs form a run-time reconfigurable interconnection mesh between the plurality of processing elements of the plurality of hardware accelerator islands, wherein the executing the first neural network includes:

streaming data between processing elements of a hardware accelerator of the plurality of hardware accelerators using a stream switch of the hardware accelerator of the plurality of hardware accelerators; and streaming data between processing elements of multiple hardware accelerator islands of the plurality of hardware accelerator islands via the run-time reconfigurable interconnection mesh, wherein streaming data between processing elements of multiple hardware accelerator islands of the plurality of hardware accelerator islands via the run-time reconfigurable interconnection mesh includes converting data streamed via SSCONNs between stream switches of the hardware accelerator islands operating with different data widths, with different channel configurations, or with different data widths and different channel configurations.

25. The method of claim 24, wherein executing the first neural network includes streaming data between a processing element and a streaming engine of a hardware accelerator island of the plurality of hardware accelerator islands via the stream switch of the hardware accelerator island of the plurality of hardware accelerator islands.

26. The method of claim 24, wherein streaming data between processing elements of multiple hardware accelerator islands of the plurality of hardware accelerator islands via the run-time reconfigurable interconnection mesh includes synchronizing data streamed via SSCONNs between stream switches of hardware accelerator islands operating with different clocks.

27. The method of claim 24, wherein streaming data between processing elements of multiple hardware accelerator islands of the plurality of hardware accelerator islands via the run-time reconfigurable interconnection mesh includes adding or removing virtual channel support in data streams streamed via SSCONNs between stream switches providing different levels of virtual channel support.

28. The method of claim 24, comprising executing a second neural network in parallel with the execution of the first neural network, wherein a first set of hardware accelerator islands of the plurality of hardware accelerator islands executes the first neural network in parallel with execution of the second neural network by a second set of hardware accelerator islands of the plurality of hardware accelerator islands.

29. The method of claim 24, wherein executing the first neural network includes processing batches of data associated with the first neural network in parallel using multiple hardware accelerator islands of the plurality of hardware accelerator islands.

30. The method of claim 24, wherein executing the first neural network includes streaming data via the reconfigurable interconnection mesh in parallel between a processing element of a hardware accelerator island of the plurality of hardware accelerator islands and multiple other processing elements coupled to the interconnection mesh.

31. The method of claim 24, comprising applying real-time power tuning to individual hardware accelerator islands of the plurality of hardware accelerator islands during execution of the neural network task.

32. The method of claim 24, comprising organizing the plurality of hardware accelerator islands into multiple security regions on a hardware accelerator island basis.

33. The method of claim 24, comprising coupling one or more of the plurality of hardware accelerator islands to a host system bus.

34. The method of claim 24, wherein the streaming data comprises employing synchronizing mechanisms and backpressure signaling.

35. A device, comprising:

memory, which, in operation, stores instructions; and processing circuitry, coupled to the memory, wherein the processing circuitry, in operation, executes the instructions to program a hardware accelerator system to process an epoch of a neural network, wherein, the hardware accelerator system includes:

a plurality of hardware accelerator islands, each hardware accelerator island including a plurality of processing elements, a plurality of streaming engines, and a stream switch coupled to the plurality of processing elements and to the plurality of streaming engines; and a plurality of unidirectional stream switch connections (SSCONNs) coupled between pairs of stream switches of the plurality of hardware accelerator islands, wherein, the stream switches of the plurality of hardware accelerator islands and the SSCONNs form a run-time reconfigurable interconnection mesh between the plurality of processing elements of the plurality of hardware accelerator islands, and the programming the hardware accelerator system to process an epoch of a neural network includes:

programming a stream switch of an island to stream an intra island data stream associated with the epoch; and programming the reconfigurable interconnection mesh to stream an inter island data stream associated with the epoch, wherein at least one of the SSCONNs includes stream link conversion circuitry, and the programming the reconfigurable interconnection mesh to stream the inter island data stream associated with the epoch includes programming the stream link conversion circuitry to covert data streamed via the at least one SSCONN between stream switches of the hardware accelerator islands operating with different data widths, with different channel configurations, or with different data widths and different channel configurations.

* * * * *